(12) United States Patent
Kimura

(10) Patent No.: US 8,587,636 B2
(45) Date of Patent: Nov. 19, 2013

(54) IMAGE PROCESSING APPARATUS AND METHOD, AND PROGRAM

(75) Inventor: Atsushi Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 394 days.

(21) Appl. No.: 12/967,797

(22) Filed: Dec. 14, 2010

(65) Prior Publication Data

US 2011/0149016 A1 Jun. 23, 2011

(30) Foreign Application Priority Data

Dec. 21, 2009 (JP) ................................. 2009-288859

(51) Int. Cl.
*H04N 7/00* (2011.01)
*H04N 5/228* (2006.01)

(52) U.S. Cl.
USPC .......................................... 348/36; 348/222.1

(58) Field of Classification Search
None
See application file for complete search history.

(56) References Cited

U.S. PATENT DOCUMENTS

| | | | |
|---|---|---|---|
| 2002/0140829 A1* | 10/2002 | Colavin et al. | 348/231.99 |
| 2006/0120625 A1* | 6/2006 | Peleg et al. | 382/284 |
| 2009/0201424 A1* | 8/2009 | Ueda | 348/565 |

FOREIGN PATENT DOCUMENTS

| | | |
|---|---|---|
| JP | 2003-198902 | 7/2003 |
| JP | 2005-333396 | 12/2005 |

OTHER PUBLICATIONS

Iiyoshi, Takeaki et al., "Image Mosaicing Method for Generating Panoramic Image", Jun. 2008, pp. 6-11.

* cited by examiner

*Primary Examiner* — David Czekaj
*Assistant Examiner* — Nam Pham
(74) *Attorney, Agent, or Firm* — Wolf, Greenfield & Sacks, P.C.

(57) ABSTRACT

An image processing apparatus includes a motion compensation parameter calculation unit that calculates a parameter for compensating a relative motion in an image pickup apparatus between picked-up images, a first connection line setting unit that sets as a first connection line a central position in an overlapping area, a moving subject detection unit that generates subject information by detecting a moving subject using the images in the overlapping area, a subject information projection unit that projects the subject information in the overlapping area on a sweep axis, a second connection line setting unit that performs setting of a second connection line on the basis of the projected subject information, an image pickup condition detection unit that detects an image pickup condition in which a two-dimensional rotation is occurred, and a connection line selection unit that selects the first or second connection line as a connection line.

5 Claims, 17 Drawing Sheets

FIG. 10A
FIG. 10B
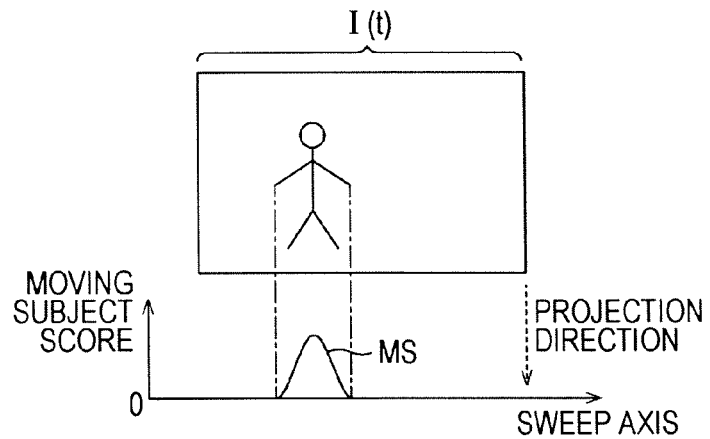
FIG. 11A
FIG. 11B
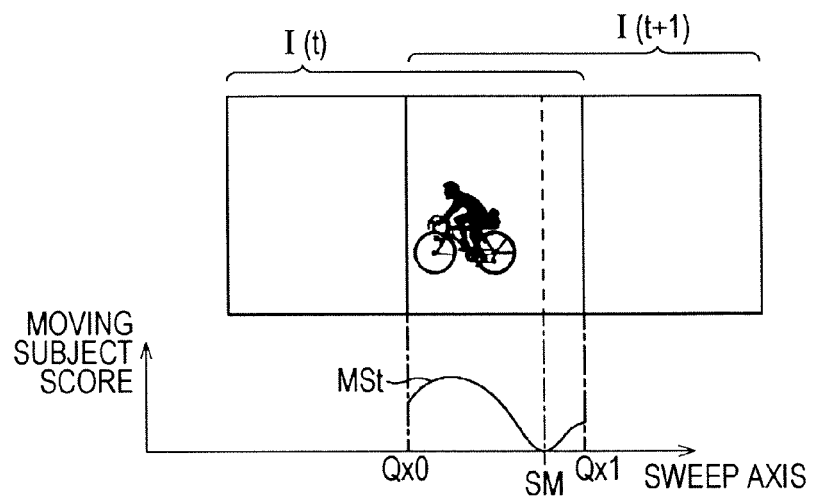

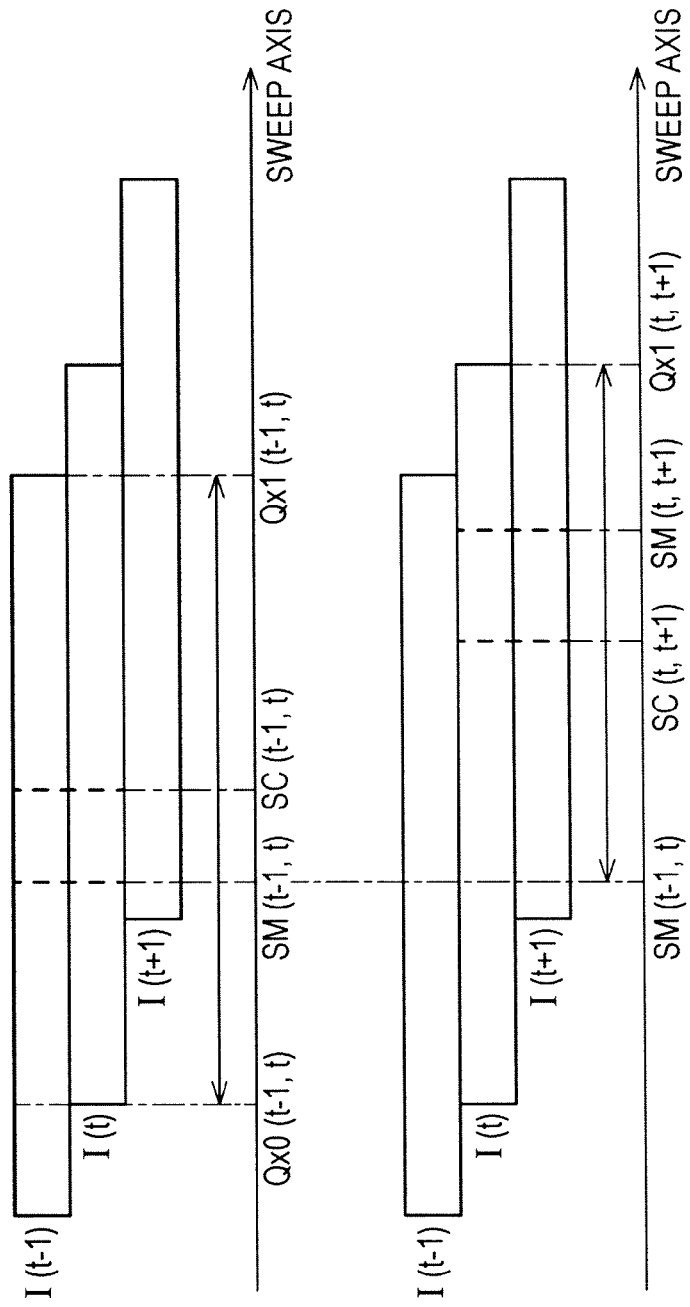

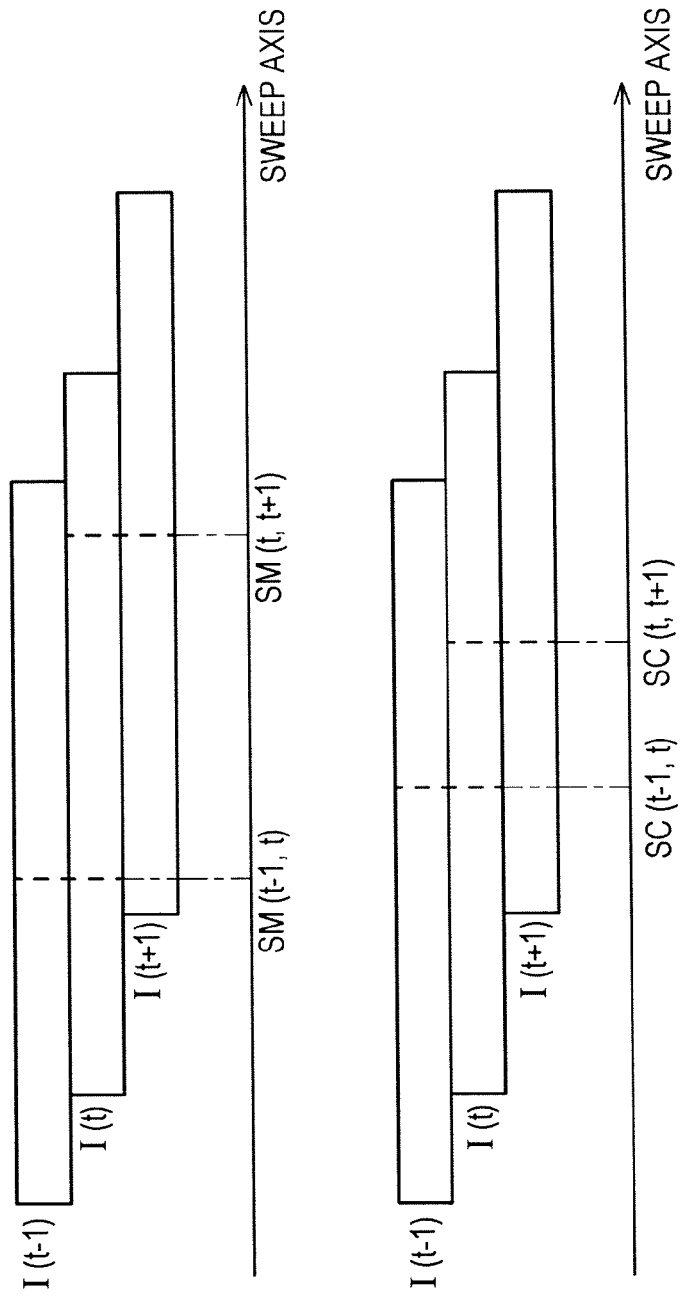

SWEEP AXIS

SWEEP AXIS

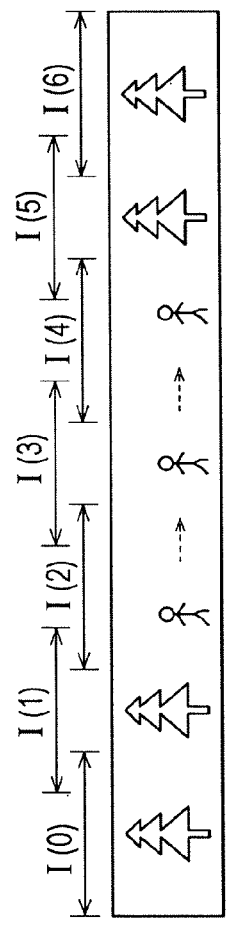
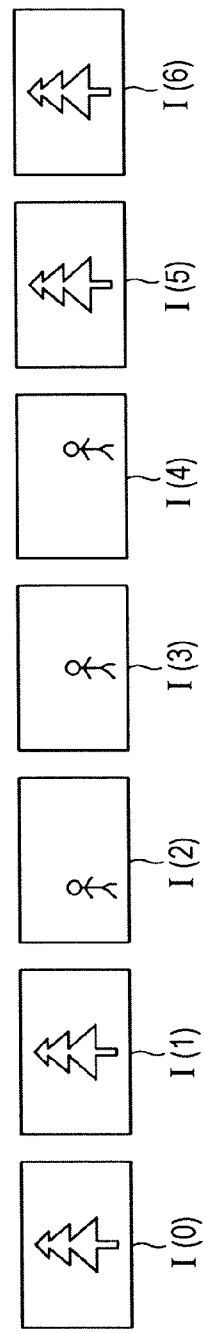
FIG. 19A
FIG. 19B

IMAGE PROCESSING APPARATUS AND METHOD, AND PROGRAM

BACKGROUND OF THE INVENTION

1. Field of the Invention

The present invention relates to an image processing apparatus and method, and a program. The invention particularly relates to an image processing apparatus and method, and a program with which a high quality panoramic image can be obtained.

2. Description of the Related Art

Up to now, a technique of generating a panoramic image by overlapping and synthesizing a plurality of still images picked up by a camera-integrated digital VCR or the like is proposed (for example, see Japanese Unexamined Patent Application Publication No. 2003-198902). As the panoramic image is an image obtained by disposing and synthesizing the plurality of still images, with the panoramic image, it is possible to display a wider area as a subject than an area on a space which is an image pickup target at a time that one still image is picked up.

Also, as a method of deciding a seam between the still images when a composition of the still images is carried out, a method of utilizing a solution for the shortest path problem in graph theory is proposed (for example, see Takeaki IIYOSHI, Wataru MITSUHASHI, "Image mosaic generation method for panoramic image creation" Image Lab, June 2008 issue, Japan Industrial Publishing Co., Ltd., published on 5 Aug. 2008, pp. 6-11).

According to this method, for example, as illustrated in FIG. 1, a seam SJ located in an overlapping area of two adjacent still image I(t) and still image I(t+1) is decided. It should be noted that in FIG. 1, the horizontal direction and the vertical direction respectively denote an x direction and a y direction, and the still image I(t) and the still image I(t+1) are overlapped and disposed on an xy coordinate system. Also, coordinates on four corners of the overlapping area are set as "(Qx0, Qy0), (Qx0, Qy1), (Qx1, Qy0), and (Qx1, Qy1)".

In the example of FIG. 1, from cost values calculated in the overlapping area of the still image I(t) and the still image I(t+1), the seam SJ having a minimum cost is calculated. To be more specific, a two-dimensional graph is generated while a high cost is set for a moving subject on the still image and in contrast, a low cost is set for a stationary subject, and the seam SJ having the minimum cost is decided. Therefore, the seam SJ is obtained where the moving subject on the still image is not divided.

When the seam SJ is calculated, a part from an end on the left side of the still image I(t) to an area in the vicinity of the seam SJ and a part from an area in the vicinity of the seam SJ of the still image I(t+1) to a right end of the still image I(t+1) are synthesized to generate a panoramic image.

By calculating the seam SJ and synthesizing the respective still images in this manner, the images are connected at positions where the seam of the images is not conspicuous, and it is possible to obtain a higher quality panoramic image.

SUMMARY OF THE INVENTION

According to embodiments of the present invention, it is desirable to obtain an even higher quality panoramic image as compared with the above-mentioned related art technique.

According to an embodiment of the present invention, there is provided an image processing apparatus including: a motion compensation parameter calculation unit that calculates a parameter for compensating a relative motion in an image pickup apparatus that performs image pickup between a plurality of picked-up images obtained by performing the image pickup while sequentially changing an image pickup direction; a first connection line setting unit that sets as a first connection line a central position with respect to a changing direction of the image pickup direction in an overlapping area where adjacent picked-up images are mutually overlapped which is determined on the basis of the motion compensation parameter; a moving subject detection unit that generates subject information by detecting a moving subject using the picked-up images in the overlapping area; a subject information projection unit that projects the subject information in the overlapping area on a sweep axis which is the changing direction of the image pickup direction; a second connection line setting unit that performs setting of a second connection line on the basis of the projected subject information; an image pickup condition detection unit that detects an image pickup condition in which a two-dimensional rotation between the picked-up images is occurred; and a connection line selection unit that selects one of the first connection line and the second connection line as a connection line for the adjacent picked-up images in accordance with a detection result of the image pickup condition detection unit.

According to the embodiment of the present invention, the motion compensation parameter calculation unit calculates the parameter for compensating the relative motion in the image pickup apparatus that performs the image pickup between the plurality of picked-up images obtained by performing the image pickup while sequentially changing the image pickup direction, for example, a global vector. The first connection line setting unit sets the central position with respect to the changing direction of the image pickup direction in the overlapping area where the adjacent picked-up images are mutually overlapped which is determined on the basis of the motion compensation parameter, that is, the central position of the sweep direction as the first connection line. The moving subject detection unit detects the moving subject by using the picked-up images in the overlapping area and generates the subject information, for example, an evaluation value in accordance with the motion amount. The subject information projection unit integrates the evaluation values at the respective positions of the picked-up images in the direction orthogonal to the sweep axis to project the subject information on the sweep axis. The second connection line setting unit sets the subject information after the projection, that is, a position where the integrated value of the evaluation values is the smallest as the second connection line. The image pickup condition detection unit detects the image pickup condition in which the two-dimensional rotation between the picked-up images is occurred. For example, a two-dimensional rotation angle between the picked-up images or an angle of the image pickup direction of the image pickup apparatus which is orthogonal to the sweep axis may be detected by the attitude detection unit. The connection line setting unit may select the first connection line when the rotation angle or the angle in the image pickup direction is larger than a previously set threshold range and select the second connection line when the rotation angle or the angle in the image pickup direction is within the threshold range. Furthermore, by utilizing the motion compensation parameter, the plurality of picked-up images may be projected on a panoramic coordinate system by the image projection unit, and a connection of the projected picked-up images may be carried out at the selected connection line by an image synthesis unit.

According to another embodiment of the present invention, there is provided an image processing method including the steps of: calculating a parameter for compensating a relative motion in an image pickup apparatus that performs image pickup between a plurality of picked-up images obtained by performing the image pickup while sequentially changing an image pickup direction; setting a first connection line a central position with respect to a changing direction of the image pickup direction in an overlapping area where adjacent picked-up images are mutually overlapped which is determined on the basis of the motion compensation parameter; using the picked-up images in the overlapping area to detect a moving subject and generating subject information; projecting the subject information in the overlapping area on a sweep axis which is the changing direction of the image pickup direction; performing a setting of a second connection line on the basis of the projected subject information; detecting an image pickup condition in which a two-dimensional rotation between the picked-up images is occurred; and selecting one of the first connection line and the second connection line as a connection line for the adjacent picked-up images in accordance with a detection result of the image pickup condition detection unit.

According to another embodiment of the present invention, there is provided a program for causing a computer to function as: motion compensation parameter calculation means that calculates a parameter for compensating a relative motion in an image pickup apparatus that performs image pickup between a plurality of picked-up images obtained by performing the image pickup while sequentially changing an image pickup direction; first connection line setting means that sets as a first connection line a central position with respect to a changing direction of the image pickup direction in an overlapping area where adjacent picked-up images are mutually overlapped which is determined on the basis of the motion compensation parameter; moving subject detection means that generates subject information by detecting a moving subject using the picked-up images in the overlapping area; subject information projection means that projects the subject information in the overlapping area on a sweep axis which is the changing direction of the image pickup direction; second connection line setting means that performs setting of a second connection line on the basis of the projected subject information; image pickup condition detection means that detects an image pickup condition in which a two-dimensional rotation between the picked-up images is occurred; and connection line selection means that selects one of the first connection line and the second connection line as a connection line for the adjacent picked-up images in accordance with a detection result of the image pickup condition detection means.

It should be noted that the program according to the embodiment of the present invention is a program which can be provided in a computer-readable format, for example, to a general-use personal computer system capable of executing various program codes by a storage medium or a communication medium, for example, the storage medium such as an optical disc, a magnetic disc, or a semiconductor memory or the communication medium such as a network. By providing such a program in a computer-readable format, the processing in accordance with the program is realized on the computer system.

According to the embodiment of the present invention, the parameter for compensating the relative motion in the image pickup apparatus that performs image pickup between the plurality of picked-up images obtained by performing the image pickup while sequentially changing the image pickup direction is calculated. As the first connection line, the central position with respect to the changing direction of the image pickup direction in the overlapping area where the adjacent picked-up images are mutually overlapped which is determined on the basis of the motion compensation parameter, that is, the central position of the sweep direction is set as the first connection line. Also, the picked-up images in the overlapping area are used to detect the moving subject, and the subject information is generated. The subject information is projected on the sweep axis which is the changing direction of the image pickup direction. On the basis of this projected subject information, the second connection line is set. Also, the image pickup condition in which the two-dimensional rotation between the picked-up images is occurred is detected. In accordance with the detected image pickup condition, the first connection line or the second connection line is selected, and the selected connection line is set as the connection line for the adjacent picked-up images. For this reason, the connection line suitable to the image pickup condition is selected, and the connection of the picked-up images at the selected connection line is carried out, so that it is easily generate the high quality panoramic image.

BRIEF DESCRIPTION OF THE DRAWINGS

FIGS. 10A and 10B are explanatory diagrams for describing moving subject scores at respective positions on a sweep axis;

FIGS. 11A and 11B are explanatory diagrams for describing a search for a connection line;

FIGS. 12A and 12B are explanatory diagrams for describing a setting order for the connection lines;

FIGS. 13A and 13B exemplify selected connection lines;

FIGS. 19A and 19B are explanatory diagrams for describing a decision order for the connection lines;

DESCRIPTION OF THE PREFERRED EMBODIMENTS

Hereinafter, embodiments for carrying out the invention will be described.

It should be noted that in a panorama composition processing of performing a motion compensation on the basis of global motion vectors, in a case where a connection is conducted at a central position with respect to a changing direction of an image pickup direction in an overlapping area, locations of connection lines in respective images are substantially constant in a situation in which movement (sweep) speeds can be regarded as constant. On the other hand, in a case where an image composition is carried out so that a seam of the images is not positioned at a location of a moving subject, the locations of connection lines are not constant between the images depending on the presence or absence of the moving subject. Due to this characteristic, in a case where the mutual images to be synthesized have a rotational component, when the connection is conducted at the central position with respect to the changing direction of the image pickup direction in the overlapping area, connection errors attributable to the rotational component are constant between the images. However, when the image composition is carried out so that the seam of the images is not positioned at the location of the moving subject, the connection errors attributable to the rotational component are varied between the images. An affect of a breaking of the seam on the synthesized panoramic image is extremely large, but such circumstances are addressed according to the embodiments of the present invention.

Figure 2:
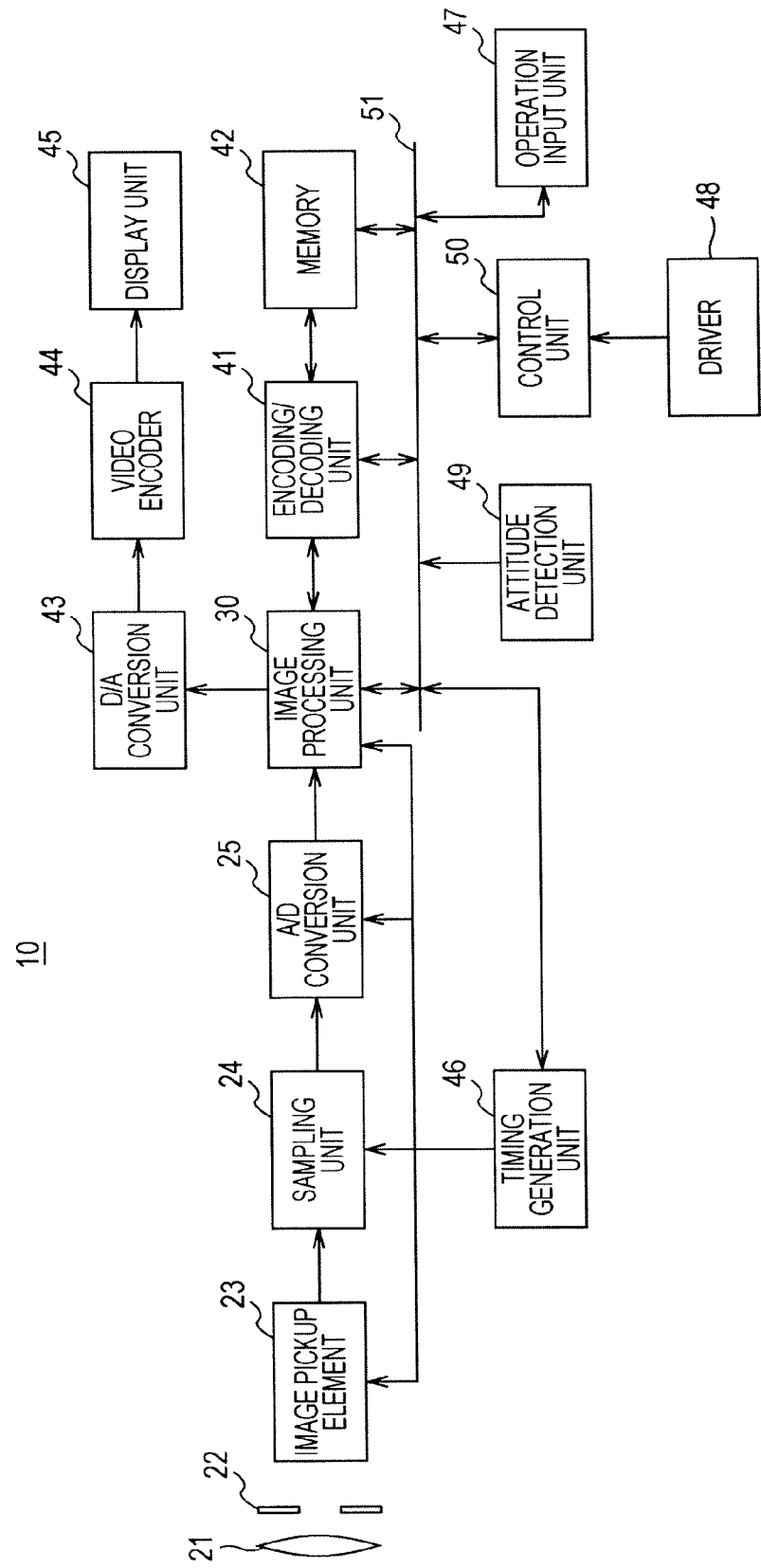
FIG. 2 illustrates a configuration example of an image pickup apparatus according to an embodiment of the present invention.

Hereinafter, a description will be given of the embodiments for carrying out the invention in the following order:
1. Configuration of image pickup apparatus
2. Operation of image pickup apparatus
3. Configuration of image processing unit
4. Panoramic image generation processing
5. Another example of subject information
6. Another example of decision order for connection lines
7. Case of executing processing by using program 1. Configuration of Image Pickup Apparatus FIG. 2 illustrates a configuration of an image pickup apparatus according to an embodiment of the present invention. An image pickup apparatus 10 is composed of an optical system, a signal processing system, a recording system, a display system, and a control system.

The optical system is composed of a lens 21 for collecting an optical image of a subject, an aperture 22 for adjusting a light amount of the optical image from the lens 21, and an image pickup element 23 for performing a photoelectric conversion on the collected light image into an electric signal. The image pickup element 23 is composed, for example, of a CCD (Charge Coupled Devices) image sensor, a CMOS (Complementary Metal Oxide Semiconductor) image sensor, or the like.

The signal processing system is composed of a sampling unit 24, an A/D (Analog/Digital) conversion unit 25, and an image processing unit 30. The sampling unit 24 is realized, for example, by a correlated double sampling unit (CDS: Correlated Double Sampling) that samples the electric signal from the image pickup element 23 to generate an analog signal. With this configuration, noise generated in the image pickup element 23 is reduced. The analog signal obtained in the sampling unit 24 is an image signal for displaying the picked-up subject image.

The A/D conversion unit 25 converts the analog signal supplied from the sampling unit 24 into a digital signal to be output to the image processing unit 30, and the image processing unit 30 applies a predetermined image processing on the digital signal input from the A/D conversion unit 25.

Also, the recording system is composed of an encoding/decoding unit 41 for encoding or decoding the image signal and a memory 42 for recording the image signal. The encoding/decoding unit 41 encodes the image signal which is the digital signal processed by the image processing unit 30 to be encoded in the memory 42 or reads out the image signal from the memory 42 and decodes the image signal to be output to the image processing unit 30.

The display system is composed of a D/A (Digital/Analog) conversion unit 43, a video encoder 44, and a display unit 45.

The D/A conversion unit 43 converts the image signal processed by the image processing unit 30 into an analog signal to be output to the video encoder 44, and the video encoder 44 encodes the image signal from the D/A conversion unit 43 into a video signal based on a format in conformity to the display unit 45. The display unit 45 is realized, for example, by an LCD (Liquid Crystal Display) or the like, and on the basis of the video signal obtained through the encoding in the video encoder 44, an image corresponding to the video signal is displayed. The display unit 45 also functions as a viewfinder at the time of image pickup for the subject.

The control system is composed of a timing generation unit 46, an operation input unit 47, a driver 48, and a control unit 50. Also, the image processing unit 30, the encoding/decoding unit 41, the memory 42, the timing generation unit 46, the operation input unit 47, and the control unit 50 are mutually connected via a bus 51.

The timing generation unit 46 controls timings for operations of the image pickup element 23, the sampling unit 24, the A/D conversion unit 25, and the image processing unit 30. The operation input unit 47 is structured by buttons, switches, and the like, and is arranged to accept a shutter operation or other command inputs by a user to output a signal in according with the operation by the user to the control unit 50.

A predetermined peripheral device is connected to the driver 48, and the driver 48 drives the connected peripheral device. For example, the driver 48 reads out data from a recording medium connected as the peripheral device such as a magnetic disc, an optical disc, an opto-magnetic disc, or a semiconductor memory and outputs the data to the control unit 50. It should be noted that the image pickup apparatus 10 may be provided with an attitude detection unit 49. The attitude detection unit 49 detects an attitude of the image pickup apparatus 10 at the time of image pickup and outputs a detection result to the image processing unit 30. For example, an acceleration sensor, an angular speed sensor, a gradient sensor, or the like is used as the attitude detection unit 49 to detect the attitude of the image pickup apparatus 10.

The control unit 50 controls an entirety of the image pickup apparatus 10. For example, via the driver 48, the control unit 50 reads out a control program from the recording medium that is connected to the driver 48 and controls an overall operation of the image pickup apparatus 10 on the basis of the control program, the command from the operation input unit 47, and the like.

2. Operation of Image Pickup Apparatus

Next, a description will be given of the operation of the image pickup apparatus 10. In the image pickup apparatus 10, the incident light from the subject, that is, the optical image of the subject enters the image pickup element 23 via the lens 21 and the aperture 22 and is subjected to the photoelectric conversion by the image pickup element 23 into an electric signal. A noise component of the electric signal obtained by the image pickup element 23 is removed by the sampling unit 24. The electric signal is digitalized by the A/D conversion unit 25 and then temporarily stored in an image memory, not illustrated in the drawing, which is built in the image processing unit 30.

It should be noted that in a normal state, in other words, in a state before the shutter operation, under the timing control by the timing generation unit 46 with respect to the signal processing system, the image signal from the A/D conversion unit 25 is regularly overwritten at a constant frame rate in the image memory of the image processing unit 30. The image signal in the image memory of the image processing unit 30 is converted by the D/A conversion unit 43 from the digital signal to the analog signal and converted by the video encoder 44 into the video signal, so that the image corresponding to the video signal is displayed on the display unit 45.

In this case, the display unit 45 also functions as the viewfinder of the image pickup apparatus 10, and the user sets a picture composition while viewing an image displayed on the display unit 45 and presses a shutter button functioning as the operation input unit 47 to instruct the pickup of the image. When the shutter button is pressed, on the basis of the signal from the operation input unit 47, the control unit 50 instructs the timing generation unit 46 to hold an image signal immediately after the shutter button is pressed. With this configuration, the signal processing system is controlled so that the image signal is not overwritten in the image memory of the image processing unit 30.

Then, after that, the image signal held in the image memory of the image processing unit 30 is encoded by the encoding/decoding unit 41 to be recorded in the memory 42. Through the above-mentioned operation of the image pickup apparatus 10, capturing of the image signal for one image is completed.

3. Configuration of Image Processing Unit

Figure 3:
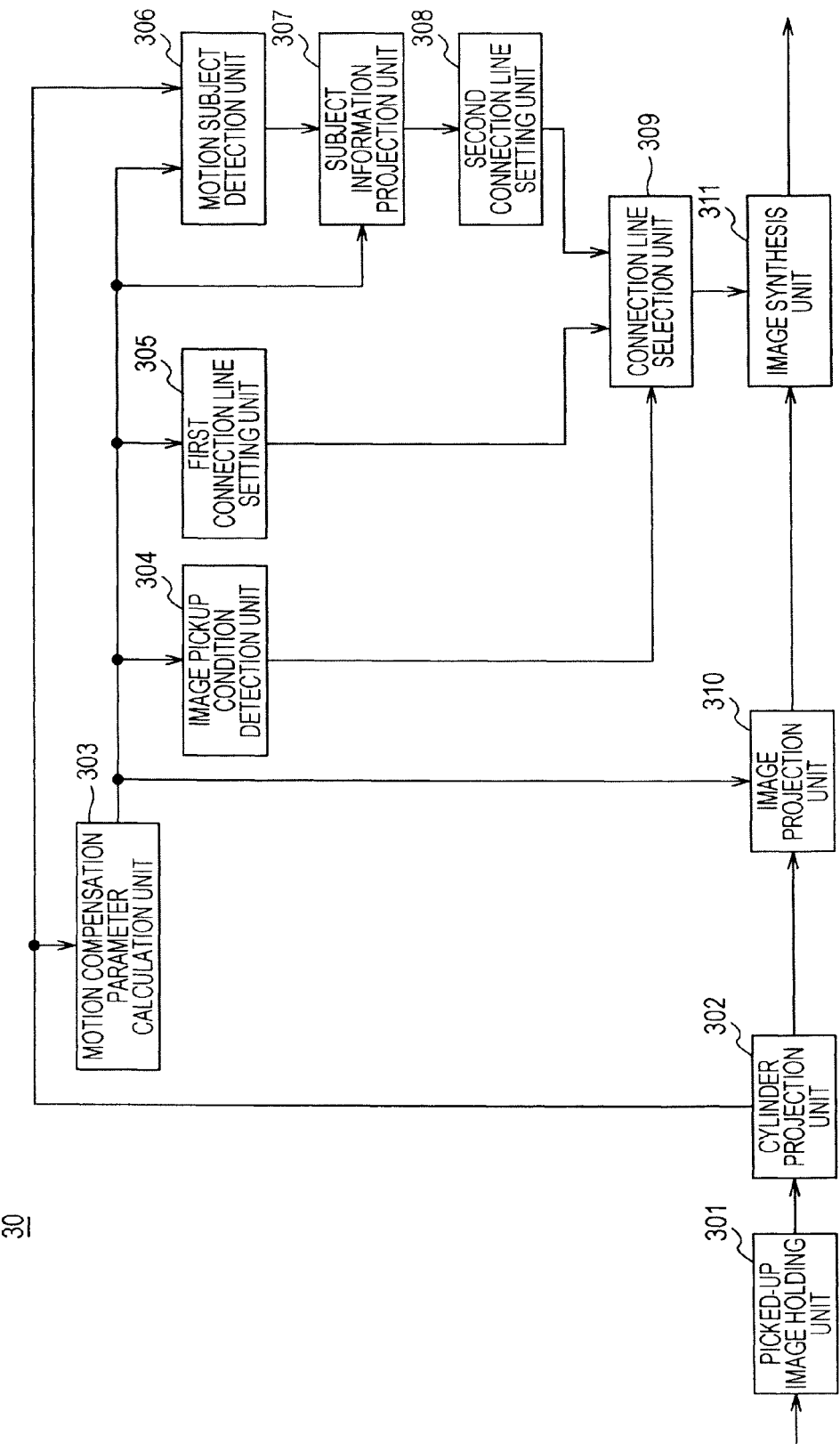
FIG. 3 illustrates a configuration example of an image processing unit.

FIG. 3 illustrates a configuration of the image processing unit 30 illustrated in FIG. 2. The image processing unit 30 is composed of a picked-up image holding unit 301, a cylinder projection unit 302, a motion compensation parameter calculation unit 303, an image pickup condition detection unit 304, a first connection line setting unit 305, a moving subject detection unit 306, a subject information projection unit 307, a second connection line setting unit 308, a connection line selection unit 309, an image projection unit 310, and an image synthesis unit 311.

The picked-up image holding unit 301 is supplied with an image of a subject picked up by the image pickup apparatus 10 (hereinafter, which will be referred to as picked-up image). The picked-up image holding unit 301 holds a plurality of supplied picked-up images. The picked-up images supplied to the picked-up image holding unit 301 are images continuously picked up in a state in which the image pickup apparatus 10 is moved (swept) in a predetermined direction. At the time of the pickup for the picked-up images, the image pickup apparatus 10 is moved so that the same subject is included on continuously picked-up two images.

It should be noted that hereinafter, among the continuously picked-up images, the picked-up image which is picked up on the t-th turn is also referred to as picked-up image I(t) in a frame F(t).

The cylinder projection unit 302 reads out the picked-up images from the picked-up image holding unit 301 and projects the read picked-up images on the cylindrical surface.

The cylinder projection unit 302 outputs the picked-up images projected on the cylindrical surface to the motion compensation parameter calculation unit 303, the moving subject detection unit 306, and the image projection unit 310.

On the basis of the picked-up images from the cylinder projection unit 302, the motion compensation parameter calculation unit 303 calculates a motion compensation parameter for compensating a motion (movement) of the image pickup apparatus 10 between frames of the picked-up images. Also, the motion compensation parameter calculation unit 303 outputs the calculated motion compensation parameter to the image pickup condition detection unit 304, the first connection line setting unit 305, the moving subject detection unit 306, the subject information projection unit 307, and the image projection unit 310. The motion compensation parameter is, for example, information on a relative positional relation between the mutual picked-up images in a case where each of the plurality of picked-up images is disposed so that the same subjects are substantially overlapped with each other.

The image pickup condition detection unit 304 detects various conditions at the time of the image pickup by using the motion compensation parameter supplied from the motion compensation parameter calculation unit 303 and outputs a detection result to the connection line selection unit 309. The image pickup condition detection unit 304 detects, for example, an image pickup condition in which a two-dimensional rotation between the picked-up images is occurred.

The first connection line setting unit 305 determines an overlapping area from the picked-up images in the continuous frames on the basis of the motion compensation parameter output from the motion compensation parameter calculation unit 303. Also, the first connection line setting unit 305 sets a central position with respect to the changing direction of the image pickup direction in the overlapping area as a first connection line. That is, in the overlapping area, the first connection line setting unit 305 passes through a midpoint in the rotational movement direction (direction of the sweep axis) of the image pickup apparatus 10 and sets a straight line orthogonal to the sweep axis as the first connection line. The first connection line setting unit outputs first connection line information representing the first connection line to the connection line selection unit 309. It should be noted that the sweep axis refers to an axis which is the same direction as the direction in which the image pickup apparatus 10 is moved at the time of the pickup for the picked-up images, and the direction of the sweep axis is previously set. With regard to the direction of the sweep axis, as the user operates the operation input unit 47, before or after the pickup of the images, among a plurality of directions, the direction of the sweep axis may also be selected. As the motion compensation parameter is a parameter for compensating the motion (movement) of the image pickup apparatus 10, on the basis of this motion compensation parameter, the direction of the sweep axis may also be decided automatically.

The moving subject detection unit 306 detects a moving subject with respect to the overlapping area where the adjacent picked-up images are mutually overlapped by using the motion compensation parameter from the motion compensation parameter calculation unit 303 and the picked-up images from the cylinder projection unit 302 and generates subject information. Also, the moving subject detection unit 306 outputs the generated subject information to the subject information projection unit 307. The moving subject detection unit 306 generates, for example, an evaluation value indicating a motion amount of the moving subject as the subject information.

The subject information projection unit 307 projects the subject information from the moving subject detection unit 306 on the sweep axis by using the motion compensation parameter from the motion compensation parameter calculation unit 303 and outputs the projection result to the second connection line setting unit 308.

The second connection line setting unit 308 sets a second connection line at a time that the picked-up images in the continuous frames are mutually connected on the basis of the projection result of the subject information supplied from the subject information projection unit 307. Also, the second connection line setting unit 308 outputs second connection line information representing the set second connection line to the connection line selection unit 309. Herein, the second connection line setting unit 308 sets the second connection line on the basis of the projection result of the subject information so that the moving subject is not included in the connected locations.

The connection line selection unit 309 selects the first connection line or the second connection line on the basis of the detection results in the image pickup condition detection unit 304. That is, the connection line selection unit 309 selects one of the first connection line information generated by the first connection line setting unit 305 and the second connection line information generated by the second connection line setting unit 308 on the basis of the image pickup condition detection results and outputs the selected connection line information to the image synthesis unit 311.

The image projection unit 310 projects the picked-up images from the cylinder projection unit 302 on the panoramic coordinate system by using the motion compensation parameter from the motion compensation parameter calculation unit 303 and outputs the projected picked-up images to the image synthesis unit 311. Herein, the panoramic coordinate system is set as a two-dimensional coordinate system using axes including an axis perpendicular to the sweep axis and the sweep axis, in other words, a predetermined plane, and the panoramic coordinate system is previously set.

The image synthesis unit 311 connects the mutual picked-up images after the projection which are supplied from the image projection unit 310 at the connection line represented by the connection line information selected by the connection line selection unit 309 to generate one panoramic image. The panoramic image is an image where all the areas serving as the image pickup targets are set as the subjects when a plurality of images are picked up.

4. Panoramic Image Generation Processing

When the user operates the operation input unit 47 and instructs a generation of a panoramic image, the image pickup apparatus 10 starts a panoramic image generation processing by picking up the images and generating the panoramic image. Hereinafter, with reference to a flow chart of FIG. 4, the generation processing for the panoramic image by the image pickup apparatus 10 will be described.

In step ST11, the image pickup element 23 carries out the image pickup of the subject. In a state in which the image pickup direction of the image pickup apparatus 10 is sequentially changed, the image pickup element 23 carries out the image pickup of the subject to generate a plurality of picked-up images, and the process proceeds to step ST12. For example, while the image pickup apparatus 10 is turned in a predetermined direction, the user instructs the image pickup apparatus 10 to continuously pick up a plurality of images.

The light from the subject enters the image pickup element 23 via the lens 21 and the aperture 22. The image pickup element 23 subjects the incident light to the photoelectric conversion to pick up the image. The thus obtained picked-up image (image signal) is supplied from the image pickup element 23 via the sampling unit 24, the A/D conversion unit 25, the image processing unit 30, and the encoding/decoding unit 41 to the memory 42 and is recorded. At this time, the picked-up image is encoded by the encoding/decoding unit 41. Also, at the time of the recording of the images in the memory 42, the respective picked-up images are assigned with frame numbers in the order of the image pickup turns.

When a plurality of picked-up images are sequentially recorded in the memory 42, those picked-up images are read out from the memory 42 to be decoded by the encoding/decoding unit 41 and supplied to the picked-up image holding unit 301 of the image processing unit 30 to be held.

It should be noted that the picked-up images obtained through the image pickup may not be recorded in the memory 42 and may be directly supplied to the picked-up image holding unit 301. Also, the picked-up image may be one picked-up still image or picked-up images for one frame which constitute a moving image.

In step ST12, the cylinder projection unit 302 projects the picked-up image on the cylindrical surface. The cylinder projection unit 302 reads out the picked-up images held in the picked-up image holding unit 301 by turns and projects the read out picked-up images on a predetermined cylindrical surface on the basis of a focal distance at the time of the image pickup for the picked-up image. Also, the cylinder projection unit 302 outputs the projected picked-up images to the motion compensation parameter calculation unit 303, the moving subject detection unit 306, and the image projection unit 310, and the process proceeds to step ST13.

Figure 5:
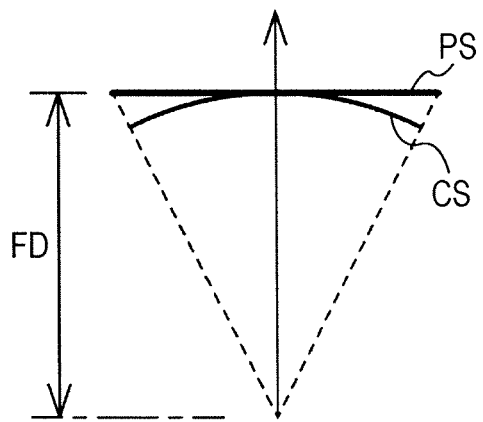
FIG. 5 is an explanatory diagram for describing a projection of a picked-up image on a cylindrical surface.

FIG. 5 is an explanatory diagram for describing the projection of the picked-up image on the cylindrical surface. For example, while a side surface of a cylinder in which a focal distance FD of the lens 21 at the time of image pickup for a picked-up image is a radius is set as a cylindrical surface CS, a picked-up image obtained by capturing an image pickup surface PS is projected on the cylindrical surface CS. That is, the projection of the image pickup surface PS on the cylindrical surface is carried out. In the example of FIG. 5, the cylindrical surface CS is set as a surface contacting the center of the image pickup surface PS. It should be noted that the focal distance of the lens 21 can be obtained from the location of the lens 21 and the like at the time of the image pickup for the pick-up image.

By projecting the pick-up image on the cylindrical surface in this manner, at the time of the generation for the panoramic image, it is possible to further suppress a shift (error) of the subject position between the connecting pick-up images.

Figure 6:
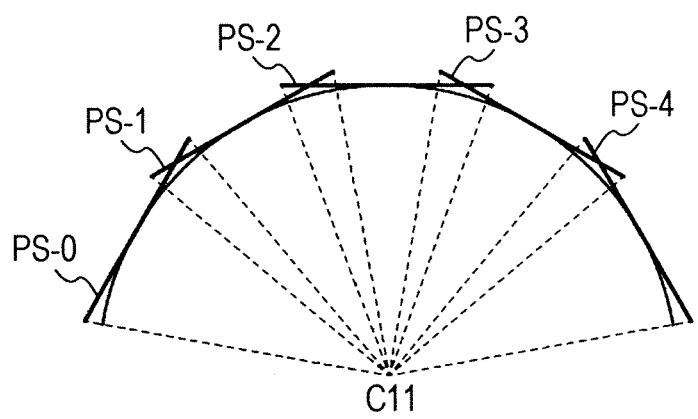
FIG. 6 is an explanatory diagram for describing a relation between the image pickup surfaces and the cylindrical surface.

FIG. 6 illustrates a relation between the image pickup surface and the cylindrical surface. As illustrated in FIG. 6, in a state in which the optical center of the image pickup apparatus 10 is located at an optical center point C11, while the image pickup apparatus 10 is swept (turned) clockwise about the optical center point C11 set as the center, the user instructs the image pickup apparatus 10 to generate a plurality of pick-up images. It should be noted that parts in FIG. 6 corresponding to the case of FIG. 5 are assigned with the same reference numerals, and a description thereof will be appropriately omitted.

In FIG. 6, the image pickup is carried out on five image pickup surfaces PS-0 to PS-4, and five pick-up images are generated. Then, the thus obtained pick-up images are respectively projected on the cylindrical surface CS. The cylindrical surface CS is a side surface of the cylinder in which the optical center point C11 is set as the center and the focal distance is the radius.

In this case, a consideration is given of a situation where the pick-up images are synthesized without change and a panoramic image is generated. In FIG. 6, the overlapping part of the images located in the vicinity of the ends of the mutually adjacent image pickup surface is spatially shifted in the radius direction of the cylindrical surface CS. For this reason, if the pick-up images are mutually overlapped without change and disposed, the positional shift of the subject is generated, and the same subjects are not overlapped with each other. Thus, the quality of the panoramic image is deteriorated.

In view of the above, after the respective pick-up images are projected on the cylindrical surface CS, the projected picked-up images are mutually overlapped and synthesized to generate the panoramic image. By generating the panoramic image in this manner, as compared with the case of synthesizing the picked-up images without being projected on the cylindrical surface, the positional shift (error) of the subject between the picked-up images can be further suppressed. Therefore, when the picked-up images are projected on the cylindrical surface CS and the projected images are synthesized to generate the panoramic image, the error in the position of the subject generated between the picked-up images is mitigated, and it is possible to obtain the panoramic image at the still higher quality.

Figure 4:
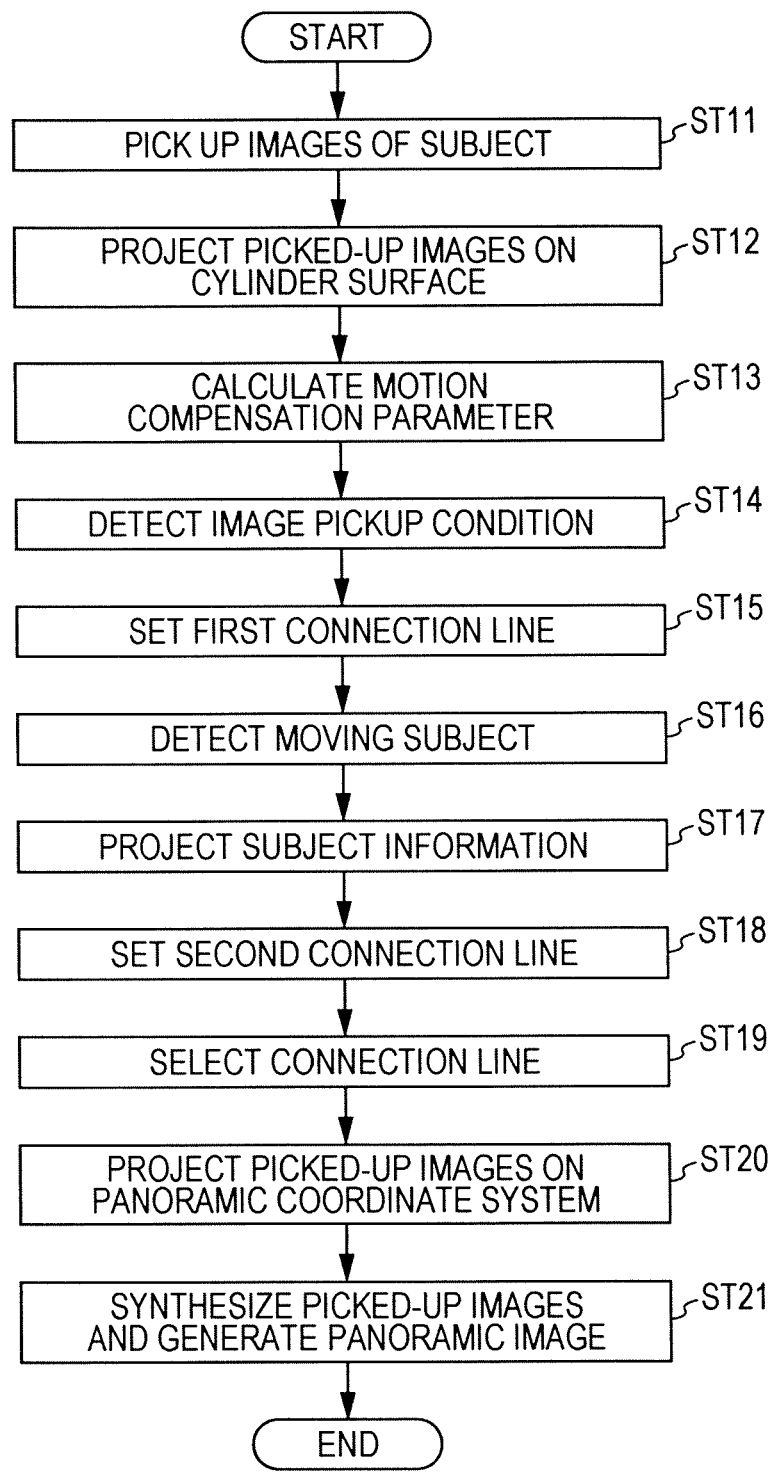
FIG. 4 is a flow chart for describing a generation method for a panoramic image.

In step ST13 of FIG. 4, the motion compensation parameter calculation unit 303 calculates the motion compensation parameter of the picked-up image for the respective picked-up images supplied from the cylinder projection unit 302. The motion compensation parameter calculation unit 303 outputs the calculated motion compensation parameter to the image pickup condition detection unit 304, the first connection line setting unit 305, the moving subject detection unit 306, the subject information projection unit 307, and the image projection unit 310, and the process proceeds to step ST14.

For example, by using the picked-up images in the continuous two frames, through the extraction of the characteristic points and the block matching, the motion compensation parameter calculation unit 303 calculates the global motion vectors of the picked-up image as the motion compensation parameter.

The global motion vector refers to a global motion vector indicating a motion between the frames of the entire subject on the picked-up image. Majority of the subjects on the picked-up image are still object without motion on the real space, and therefore it can be mentioned that the global motion vector is a vector indicating a motion between the frames of the still object on the picked-up image, in other words, a motion of the image pickup apparatus 10 at the time of the image pickup for the picked-up images.

It should be noted that the motion compensation parameter is not limited to the global motion vectors but may also be a parameter with which the motion of the image pickup apparatus 10 can be compensated, for example, a planar project matrix, an affine matrix, and the like. The planar project matrix and the affine matrix can be obtained from the extraction of the characteristic points and the block matching using the picked-up images in the continuous two frames. In a case where the global motion vectors is adopted as the motion compensation parameter, it is possible to obtain the motion compensation parameter at a still lower calculation cost as compared with the case of adopting the planar project matrix or the affine matrix.

In step ST14, the image pickup condition detection unit 304 detects the image pickup condition at the time of the image pickup by using the motion compensation parameter which is output from the motion compensation parameter calculation unit 303. The picked-up images obtained through the image pickup during the sweep has a two-dimensional rotation between the picked-up images in a case where the image pickup direction of the image pickup apparatus 10 has a gradient with respect to the direction orthogonal to a rotation axis of a sweep operation.

Figure 7:
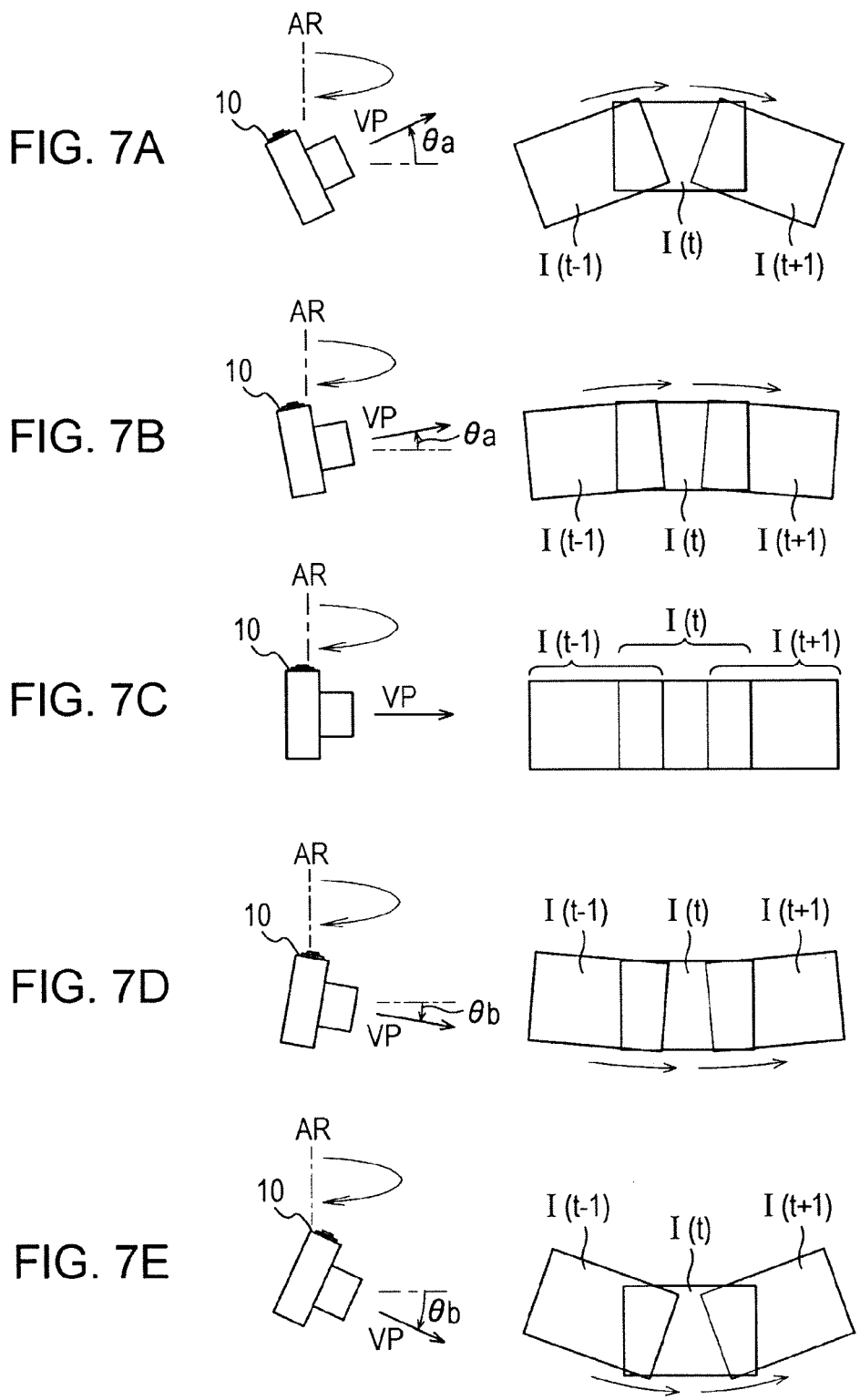
FIGS. 7A to 7E are explanatory diagrams for describing relations between a gradient of an image pickup direction and a rotation angle among the picked-up images.

FIGS. 7A to 7E are explanatory diagrams for describing relations between the gradient of the image pickup direction of the image pickup apparatus 10 and the rotation angle between the picked-up images. For example, as illustrated in FIG. 7C, in a case where an angle defined by a rotation axis AR of the sweep operation and the image pickup direction VP is 90 degrees, the two-dimensional rotation between the picked-up images is not occurred. Next, as illustrated in FIG. 7B, in a case where the angle of the image pickup direction VP with respect to the rotation axis AR of the sweep operation is smaller than 90 degrees and the image pickup direction VP has an elevation angle θa with respect to the direction orthogonal to the rotation axis AR of the sweep operation, the two-dimensional rotation angle between the picked-up images is generated. Also, as illustrated in FIG. 7A, when the elevation angle θa is larger, the rotation angle between the picked-up images becomes larger. As illustrated in FIG. 7D, in a case where the angle of the image pickup direction VP with respect to the rotation axis AR of the sweep operation is larger than 90 degrees and the image pickup direction VP has a depression angle θb with respect to the direction orthogonal to the rotation axis AR of the sweep operation, a rotation angle between the picked-up images is generated. Also, as illustrated in FIG. 7E, when the depression angle θb is larger, the rotation angle between the images becomes larger. It should be noted that the rotation of the picked-up image in a case where the depression angle θb exists is an inverted direction with respect to the rotation in a case where the elevation angle θa exists.

In this manner, a case may occur in which the two-dimensional rotation between the picked-up images is occurred, and the image pickup condition detection unit 304 detects the image pickup condition in which the two-dimensional rotation between the picked-up images is occurred. To be more specific, the image pickup condition detection unit 304 detects the two-dimensional rotation angle between the picked-up images on the basis of the motion compensation parameter calculated by the motion compensation parameter calculation unit 303 (for example, the global motion vectors). Furthermore, the image pickup condition detection unit outputs the detected rotation angle as the image pickup condition to the connection line selection unit 309. Also, the image pickup condition detection unit 304 may obtain the affine matrix for subjecting the picked-up image to a geometric conversion to a position after the rotation and obtain the rotation angle from this affine matrix. Also, the two-dimensional rotation between the picked-up images is occurred when the image pickup direction has the elevation angle or the depression angle with respect to the direction orthogonal to the rotation axis of the sweep operation. Therefore, the image pickup apparatus 10 may be provided with the attitude detection unit 49, and the attitude detection unit 49 may detect the angle of the image pickup direction with respect to the rotation axis of the sweep operation to set the detected angle as the image pickup condition. In a case where the two-dimensional rotation between the picked-up images is changed by not only the angle of the image pickup direction with respect to the rotation axis of the sweep operation but also another image pickup condition, a detection of the other image pickup condition is also carried out.

In step ST15, the first connection line setting unit 305 sets the first connection line. The first connection line setting unit 305 determines the overlapping area where the picked-up images are mutually overlapped on the basis of the motion compensation parameter from the motion compensation parameter calculation unit 303. Furthermore, the first connection line setting unit 305 sets first connection line which is orthogonal to the sweep direction at the central position in the sweep direction in the overlapping area and outputs the first connection line information representing the set first connection line to the connection line selection unit 309, and the process proceeds to step ST16.

Figure 8:
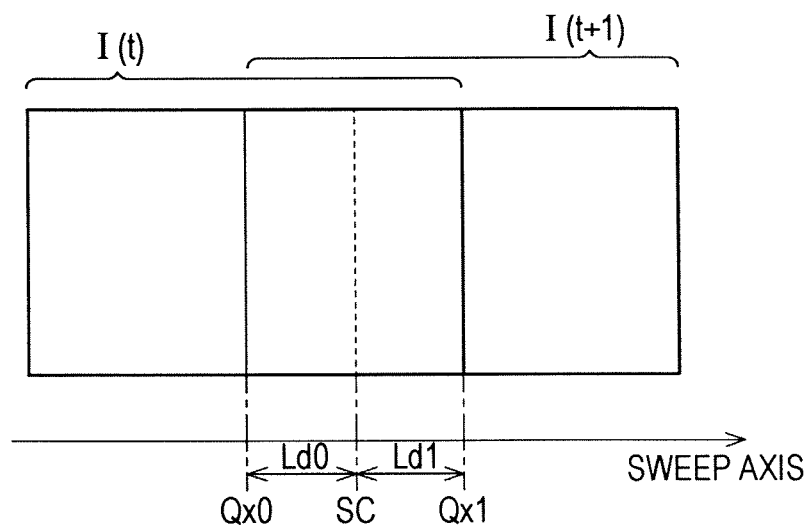
FIG. 8 is an explanatory diagram for describing a setting on a first connection line.

FIG. 8 is an explanatory diagram for describing the setting of the first connection line. When the first connection line for synthesizing the picked-up image I(t) with a picked-up image I(t+1) is set, the first connection line setting unit 305 detects a range from a position Qx0 to a position Qx1 on the sweep axis corresponding to the overlapping area where the picked-up image I(t) and the picked-up image I(t+1) are mutually overlapped. Herein, the position Qx0 is a position on the left end of the picked-up image I(t+1) when the picked-up image I(t+1) is projected on the sweep axis, and the position Qx1 is a position on the right end of the picked-up image I(t) when the picked-up image I(t) is projected on the sweep axis.

The first connection line setting unit 305 sets a central position SC from the position Qx0 to the position Qx1 on the sweep axis as the first connection line connecting the picked-up image I(t) with the picked-up image I(t+1). That is, the first connection line setting unit 305 sets the first connection line so that a distance Ld0 from the position Qx0 to the position SC is equal to a distance Ld1 from the position SC to the position Qx1.

In step ST16 of FIG. 4, the moving subject detection unit 306 performs the moving subject detection. The moving subject detection unit 306 detects the moving subject in the overlapping area where the picked-up images are mutually overlapped by using the motion compensation parameter from the motion compensation parameter calculation unit 303 and the picked-up images from the cylinder projection unit 302. Also, the moving subject detection unit 306 generates subject information indicating the detected moving subject to be output to the subject information projection unit 307, and the process proceeds to step ST17.

Figure 9:
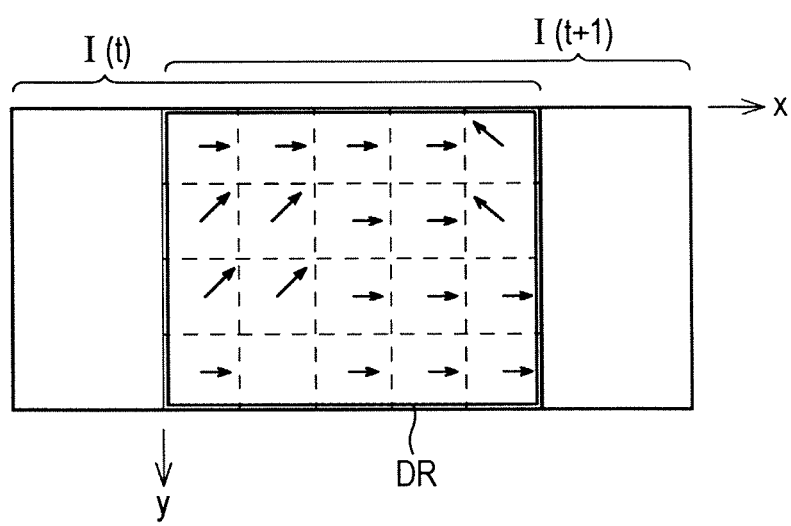
FIG. 9 is an explanatory diagram for describing a detection of a moving subject and a generation of subject information.

For example, as illustrated in FIG. 9, by using the motion compensation parameter, the moving subject detection unit 306 disposes the picked-up image I(t) in the frame F(t) and the picked-up image I(t+1) in a frame F(t+1) which are two continuous frames so that the same subject on these picked-up images are substantially overlapped with each other.

Then, the moving subject detection unit 306 divides an overlapping area DR in the picked-up image I(t) which is overlapped with the picked-up image I(t+1) into several blocks (hereinafter, which will be referred to as block) and obtains a motion vector LMV for each block on the basis of a block matching.

That is, the motion vectors LMV of the respective blocks can be obtained by searching for an area on the picked-up image I(t+1) having a smallest difference with respect to a block of a processing target on the picked-up image I(t). For example, the difference with respect to the block is set as a differential absolute value sum between a pixel value of a pixel in the block and a pixel value of a pixel in the picked-up image I(t+1) corresponding to the pixel.

In FIG. 9, one square indicated by a dotted line in the overlapping area DR represents one block, and arrows in the respective blocks represent the motion vectors LMV of those blocks. This motion vector LMV is a vector indicating a motion between the frames of the subject in the respective areas of the picked-up images in a state in which the picked-up image I(t) and the picked-up image I(t+1) are disposed by using the motion compensation parameter.

Next, the moving subject detection unit 306 calculates a global motion vector GMV (global motion vector) representing a motion of an entirety of the picked-up image I(t) by using the obtained motion vectors LMV of the respective blocks. For example, the global motion vector GMV is set as a median value of the motion vectors LMV of the respective blocks.

It should be noted that the global motion vector GMV may be obtained through a robust estimation or may also be set as a motion vector LMV having the most frequently detected direction and size among the obtained motion vectors LMV of the blocks.

The thus obtained global motion vector GMV represents a motion of the entire subject on the picked-up images, and a block having a motion vector LMV different from the global motion vector GMV includes the moving subject which is a subject in motion on the real space.

Furthermore, the moving subject detection unit 306 calculates the presence or absence of the moving subject in the respective positions in the overlapping area DR on the picked-up image I(t) and an evaluation value (cost value) indicating a size of the motion (degree of the motion) by using the obtained global motion vector GMV and the motion vectors LMV of the respective blocks.

To be more specific, while a consideration is given of the xy coordinate system in which an apex on the upper left of the overlapping area DR illustrated in FIG. 9 is set as a reference, for example, the moving subject detection unit 306 calculates an evaluation value (cost value), cost (x, y), at a position with the coordinates (x, y) on the xy coordinate system in the overlapping area DR on the basis of the following expression (1). It should be noted that in FIG. 9, the horizontal direction is set as the x direction, and the vertical direction is set as the y direction. Also, the sweep axis is set as the x direction.

$$\mathrm{cost}(x,y)=|GMV-LMV(x,y)| \tag{1}$$

It should be noted that in the expression (1), GMV represents a motion vector GMV of the entire picked-up image I(t), and LMV (x, y) indicates a motion vector LMV of a block including a position of coordinates (x, y). To elaborate, the evaluation value at each position is set as a differential absolute value between the global motion vector GMV and the motion vector LMV of the block.

Therefore, as the evaluation value at the position in the overlapping area DR is larger, the moving subject having a larger motion is displayed at the position. The moving subject detection unit 306 outputs the thus obtained evaluation value as the subject information to the subject information projection unit 307.

It should be noted that in FIG. 9, the example has been described in which the detection of the moving subject in units of block, in other words, the detection of the motion vectors is carried out, but the motion vectors may also be detected for each pixel in the overlapping area DR.

Also, the example has been described in which as the subject information, the presence or absence of the moving subject and the evaluation value indicating the degree of the motion of the moving subject are obtained, but the subject information at the respective positions in the overlapping area DR may also be a binary value indicating whether or not the moving subject is included in the position.

It should be however noted that if the subject information is multi-valued information, in the second connection line setting unit 308 which will be described below, it is possible to obtain the position with the still smaller positional shift of the subject as the connection line.

That is, in order to generate the panoramic image, the second connection line setting unit 308 sets the connection line for mutually connecting the continuously picked-up images. At this time, in order to obtain the panoramic image having the still higher quality, the setting of the connection line that divides the moving subject is avoided as much as possible, but due to a reason that the area of the moving subject is large or the like, in some cases, the position of the moving subject is reluctantly set as the connection line. In such a case, if information indicating the degree of the motion of the moving subject is included in the subject information as multi-valued information, it is possible to obtain the position having the smallest motion of the subject as the connection line. With this configuration, the image shift in the vicinity of the connection position of the mutually connected picked-up images, in other words, the positional shift of the subject at a time that the two picked-up images are overlapped with each other can be reduce to the minimum, and it is possible to suppress the degradation in the quality of the panoramic image.

In step ST17 of FIG. 4, the subject information projection unit 307 projects the subject information. The subject information projection unit 307 projects the subject information from the moving subject detection unit 306 on the sweep axis and calculates a total sum of the evaluation values at the respective positions on the sweep axis to generate a moving subject score by using the motion compensation parameter from the motion compensation parameter calculation unit 303. The subject information projection unit 307 outputs the generated moving subject score to the second connection line setting unit 308, and the process proceeds to step ST18.

That is, the subject information projection unit 307 integrates the evaluation values at the respective positions on the picked-up images in the direction vertical to the sweep axis to have the moving subject score, so that the evaluation values are projected on the sweep axis. The moving subject score serving as the projection result becomes larger in accordance with the area (size) of the moving subject in the area corresponding to the picked-up image.

For example, when the sweep axis is set as the x direction as in FIG. 9, the subject scores at the respective positions on the sweep axis are total sums of the evaluation values at the position on the picked-up image where the x coordinate is the same value as the x coordinate at the position on the sweep axis. To be more specific, it is assumed that the value of the xy coordinate system corresponding to a predetermined position on the sweep axis is, for example, "x0". In this case, the total sum of cost(x0, y) at the position where the x coordinate on the overlapping area DR is "x0" is obtained as the moving subject score at a predetermined position on the sweep axis.

As a result, for example, as illustrated in FIGS. 10A and 10B, the moving subject scores at the respective positions on the sweep axis are obtained. It should be noted that FIG. 10A illustrates the picked-up image I(t), and FIG. 10B illustrates the moving subject score of the picked-up image I(t). It should be noted that in FIG. 10B, the horizontal direction indicates the direction of the sweep axis, and the vertical direction indicates the moving subject scores at the respective positions on the sweep axis. Also, a score line MS is a line indicating the moving subject scores at the respective positions on the sweep axis.

In the picked-up image I(t), as the moving subject is included at the center or slightly on the left side of the picked-up image I(t), at the position on the sweep axis corresponding to the part of the moving subject, the moving subject score is large. On the other hand, the evaluation value for the part where the moving subject is not included is "0". Also, the evaluation value is not obtained in the area that is not overlapped with the adjacent picked-up image. Thus, at the position on the sweep axis corresponding to the area where the moving subject of the picked-up image I(t) does not exist, the moving subject score is "0".

The subject information projection unit 307 projects the evaluation values serving as the subject information for all the picked-up images on the sweep axis in this manner to obtain the moving subject scores at the respective positions on the sweep axis. It should be noted that in the subject information projection unit 307, on which position on the sweep axis the evaluation value for each area of the respective picked-up images is projected can be found out from the motion compensation parameter for each picked-up image.

By projecting the subject information on the sweep axis to obtain the moving subject scores at the respective positions on the sweep axis, it is possible to convert the two-dimensional information used for setting the connection line into one-dimensional information. With this configuration, the information amount used for deciding the connection line is reduced, and the memory capacity for recording the information can be saved.

In step ST18 of FIG. 4, the second connection line setting unit 308 performs the setting of the second connection line. The second connection line setting unit 308 sets the second connection line at a time that the picked-up images are connected on the basis of the moving subject scores from the subject information projection unit 307 and outputs second connection line information indicating this second connection line to the connection line selection unit 309, and the process proceeds to step ST19.

FIGS. 11A and 11B are explanatory diagrams for describing a search for the connection line. For example, as illustrated in FIGS. 11A and 11B, it is assumed that from the picked-up image I(t), a moving subject score indicated by a score line MSt is obtained. It should be noted that FIG. 11A illustrates the picked-up image I(t) and the picked-up image I(t+1), and FIG. 11B illustrates the moving subject score. The horizontal direction is the direction of the sweep axis, and the vertical direction is the size of the moving subject scores at the respective positions on the sweep axis.

When a connection time at a time that the picked-up image I(t) and the picked-up image I(t+1) are synthesized with each other is set, the second connection line setting unit 308 sets a range from the position Qx0 to the position Qx1 on the sweep axis corresponding to the overlapping area where the picked-up image I(t) and the picked-up image I(t+1) are mutually overlapped as a search range. Herein, the position Qx0 is a position on the left end of the picked-up image I(t+1) when the picked-up image I(t+1) is projected on the sweep axis, and the position Qx1 is a position on the right end of the picked-up image I(t) when the picked-up image I(t) is projected on the sweep axis.

The second connection line setting unit 308 sets a range from the position Qx0 to the position Qx1 on the sweep axis as the search range, and the position having the smallest moving subject score in the search range is set as the second connection line for connecting the picked-up image I(t) and the picked-up image I(t+1) with each other.

It should be noted that in FIGS. 11A and 11B, at the position SM in the search range on the sweep axis, the moving subject score indicated by the score line MSt is the smallest, and thus the position SM is set as the second connection line. Therefore, while the position of the sweep axis is at the position SM, the second connection line setting unit 308 sets the straight line with respect to the sweep axis as the second connection line.

The second connection line is at the position SM having the smallest moving subject score in the search range and is at the position where the motion of the subject is the smallest among the respective positions on the sweep axis. To elaborate, in a case where the picked-up image I(t) and the picked-up image I(t+1) are disposed on a predetermined surface so that the same subjects are substantially overlapped with each other on the basis of the motion compensation parameter, the position SM is a position where the shift of the picked-up images, for example, the positional shift of the subject on the picked-up images, a color error of the pixels in the mutually overlapping area, or the like is the smallest.

In this manner, in the second connection line setting unit 308, through the one-dimensional search processing which is the search for the position of the sweep axis where the dividing score of the moving subject is the smallest, it is possible to simply and promptly set the connection line.

Also, the first connection line setting unit 305 and the second connection line setting unit 308 perform the above-mentioned processing to set the first connection line and the second connection line for the adjacent picked-up images with regard to all the picked-up images.

The first connection line setting unit 305 and the second connection line setting unit 308 sets the first connection line and the second connection line for the picked-up images, for example, in ascending order of the frame numbers, in other words, in ascending order of the image pickup times. FIGS. 12A and 12B illustrate a case in which the setting of the first connection line and the second connection line is carried out in ascending order of the frame numbers.

In FIGS. 12A and 12B, a picked-up image I(t−1), the picked-up image I(t), and the picked-up image I(t+1) in three continuous frames including a frame F(t−1), the frame F(t), and the frame F(t+1) are respectively disposed on the basis of the motion compensation parameter. Among the picked-up image I(t−1), the picked-up image I(t), and the picked-up image I(t+1), the picked-up image with the smallest frame number is the picked-up image I(t−1). Therefore, the first connection line setting unit 305 and the second connection line setting unit 308 set the first connection line and the second connection line in an overlapping area of the picked-up image I(t−1) and the picked-up image I(t).

That is, as illustrated in FIG. 12A, the first connection line setting unit 305 and the second connection line setting unit 308 set the first connection line and the second connection line where the picked-up image I(t−1) and the picked-up image I(t) which are adjacent are overlapped with each other in the range from the position Qx0 (t−1, t) to Qx1 (t−1, t) on the sweep axis. As a result, the position SC (t−1, t) at the center between the position Qx0 (t−1, t) and the position Qx1 (t−1, t) becomes the first connection line. Also, the position SM (t−1, t) having the smallest moving subject score in the range from the position Qx0 (t−1, t) to the position Qx1 (t−1, t) becomes the second connection line.

Next, as illustrated in FIG. 12B, the first connection line setting unit 305 and the second connection line setting unit 308 set the first connection line and the second connection line with respect to the picked-up image I(t) and the picked-up image I(t+1). The first connection line setting unit 305 sets the position SC (t, t+1) at the center in the range where the picked-up image I(t) and the picked-up image I(t+1) which are mutually adjacent as in the above-mentioned manner are mutually overlapped as the first connection line.

Also, the end on the left side of the area where the picked-up image I(t) and the picked-up image I(t+1) are mutually overlapped, in other words, the position at the left end of the picked-up image I(t+1) is located further on the left side with respect to the previously set position SM (t−1, t) on the connection line for the picked-up image I(t−1) and the picked-up image I(t). Therefore, the second connection line setting unit 308 sets the second connection line by excluding the area which is located on the left side of the position SM (t−1, t) from the search range and setting a range from the position SM (t−1, t) to the position Qx1 (t, t+1) which is located on the right end of the picked-up image I(t) as the search range. As a result, the position SM(t, t+1) having the smallest moving subject score in the search range is set as the second connection line.

In step ST19 of FIG. 4, the connection line selection unit 309 performs a setting of the connection line. On the basis of the image pickup condition detected by the image pickup condition detection unit 304, the connection line selection unit 309 selects one of the first connection line information generated by the first connection line setting unit 305 and the second connection line information generated by the second connection line setting unit 308. Also, the connection line selection unit 309 outputs the selected connection line information to the image synthesis unit 311, and the process proceeds to step ST20.

In a case where the two-dimensional rotation between the picked-up images does not exist or the rotation angle is small, when a panoramic image is generated by connecting the images at the second connection line set by the second connection line setting unit 308, breaking of a seam at the moving subject does not occur. For this reason, as compared with the case where the connection of the images is carried out at the first connection line set by the first connection line setting unit 305, the panoramic image attains a satisfactory result. Also, in a case where the two-dimensional rotation between the picked-up images is large, the error due to the rotation becomes large. For this reason, by connecting the images at the first connection line set by the first connection line setting unit 305, as compared with the case where the connection of the images is carried out at the second connection line set by the second connection line setting unit 308, the panoramic image attains a satisfactory result. Thus, the connection line selection unit 309 compares the image pickup condition input from the image pickup condition detection unit 304 with a threshold. In a case where the two-dimensional rotation is larger than a threshold range, the connection line selection unit 309 selects the first connection line information to be output to the image synthesis unit 311. On the other hand, in a case where the two-dimensional rotation is within the threshold range, the connection line selection unit 309 selects the second connection line information to be output to the image synthesis unit 311. For example, in a case where the two-dimensional rotation angle between the picked-up images or the angle of the image pickup direction with respect to the rotation axis of the sweep operation is larger than the threshold range, the connection line selection unit 309 selects the first connection line information to be output to the image synthesis unit 311. Also, in a case where the two-dimensional rotation angle between the picked-up images or the angle of the image pickup direction with respect to the rotation axis of the sweep operation is within the threshold range, the connection line selection unit 309 selects the second connection line information to be output to the image synthesis unit 311.

FIGS. 13A and 13B exemplify the selected connection lines. For example, as illustrated in FIGS. 12A and 12B, the positions SC (t−1, t) and SC (t, t+1) are the first connection line, and the positions SM (t−1, t) and (t, t+1) are the second connection line. In this case, the connection line selection unit 309 outputs the second connection line information indicating the second connection line illustrated in FIG. 13A to the image synthesis unit 311 in a case where the two-dimensional rotation between the picked-up images does not exist or the rotation is small. Also, the connection line selection unit 309 outputs the first connection line information representing the first connection line illustrated in FIG. 13B to the image synthesis unit 311 in a case where the two-dimensional rotation between the picked-up images is large.

In step ST20 of FIG. 4, the image projection unit 310 projects the picked-up images on the panoramic coordinate system. The image projection unit 310 projects the picked-up images from the cylinder projection unit 302 on the panoramic coordinate system by using the motion compensation parameter from the motion compensation parameter calculation unit 303. Also, the image projection unit 310 outputs the projected picked-up images to the image synthesis unit 311, and the process proceeds to step ST21.

With this projection, so that the subjects on the picked-up images are substantially overlapped with each other, the plurality of picked-up images are disposed on the panoramic coordinate system. It should be noted that the panoramic coordinate system is a plane having axes including an axis perpendicular to the sweep direction and the sweep axis. For example, in a case where the sweep axis is set as a direction perpendicular to the vertical direction in the image pickup space at the time of the image pickup for the picked-up images, the axis perpendicular to the sweep axis is set as the vertical direction.

In step ST21, the image synthesis unit 311 synthesizes the picked-up images to generate a panoramic image. The image synthesis unit 311 connects the projected picked-up images at the connection line represented by the connection line information selected by the connection line selection unit 309 in the panoramic coordinate system supplied from the image projection unit 310 to generate one panoramic image. Also, in a case where the picked-up images are connected at the connection line, a color difference or the like may be conspicuous at the connection line in some cases. Therefore, the image synthesis unit 311 may provide a connection area while the connection line is used as a reference, perform a blending processing in this connection area, and perform a weighting addition on the connected picked-up images.

Figure 14A:
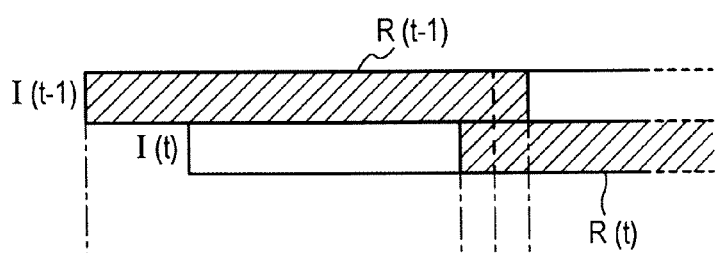
FIGS. 14A to 14C are explanatory diagrams for describing a connection of picked-up images.
Figure 14B:
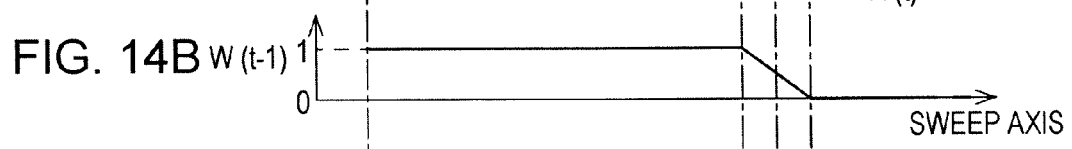
Figure 14C:
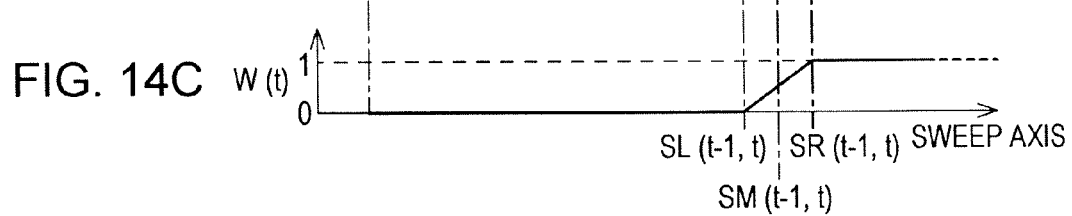

FIGS. 14A to 14C are explanatory diagrams for describing the connection of the picked-up images. FIGS. 14A to 14C illustrate a case in which the picked-up image I(t−1) is connected with the picked-up image I(t) at the second connection line which is the position SM (t−1, t). It should be noted that in FIGS. 14A to 14C, the horizontal direction represents the sweep direction, and the picked-up image I(t−1) and the picked-up image I(t) in the two continuous frames are displayed on the panoramic coordinate system. Also, FIG. 14A illustrates effective areas used for the panoramic image are represented as shaded areas. FIG. 14B illustrates a weight W(t−1) with respect to the picked-up image I(t−1), and FIG. 14C illustrates a weight W(t) with respect to the picked-up image I(t).

For example, the connection area ranges from a position SL (t−1, t) to a position SR (t−1, t) so that the position SM (t−1, t) on the connection line becomes the central position of the connection area. At this time, in the picked-up image I(t−1), the area up to the position SR (t−1, t) becomes an effective area R(t−1). Also, in the picked-up image I(t), the area from the position SL (t−1, t) becomes an effective area R(t) for the picked-up image I(t).

For the weighting, "0" is set on the end side of the effective area in the connection area and "1" is set on the other end side. Also, in FIGS. 14B and 14C, the weightings are set by lines OMa and OMb. It should be noted that the embodiment is not limited to the case in which the weightings are set by the lines OMa and OMb. At the respective positions in the connection area, a sum of the weighting for the picked-up image I(t−1) and the weighting for the picked-up image I(t) is "1", and the weighting is set to be sequentially reduced in such a manner that the weighting at the end side of the effective area becomes "0".

By setting the connection area while the connection line is used as the reference in this manner and changing the synthesis ratio between the picked-up image I(t−1) and the picked-up image I(t) in the connection area, the switching of the images from the picked-up image I(t−1) to the picked-up image I(t) is sequentially carried out. Therefore, it is possible to obtain the panoramic image at the still higher quality. That is, in the part where the connected two effective areas are mutually overlapped, even in a case where the positional shift of the subject exists or the colors of the pixels are different, a smoothing effect is obtained through the weighting addition. With this configuration, the situation in which a part of the subject is lost or the color unevenness is generated in the panoramic image can be suppressed, and it is possible to obtain the still more natural panoramic image.

In this manner, the image synthesis unit 311 connects the effective areas of the mutually adjacent picked-up images on the panoramic coordinate system to generate one panoramic image. Furthermore, the image synthesis unit 311 may perform trimming and a part of the area in one image composed of the connected effective area may be set as the panoramic image.

Figure 15A:
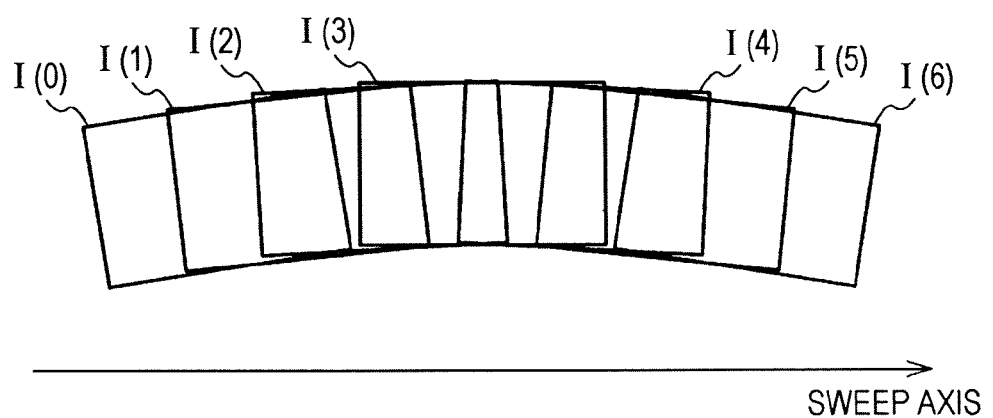
FIGS. 15A and 15B are explanatory diagrams for describing a trimming of a panoramic image.
Figure 15B:
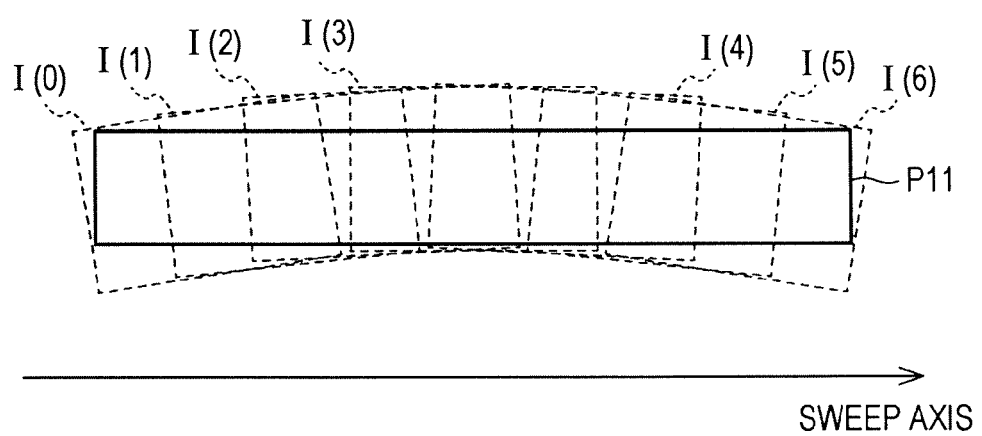

FIGS. 15A and 15B are explanatory diagrams for describing a trimming of a panoramic image. For example, when picked-up images are generated while the image pickup apparatus 10 is swept, in a case where the image pickup apparatus 10 has an elevation angle, as illustrated in FIG. 15A, continuously picked-up images I(0) to I(6) have two-dimensional rotations between the images, and fluctuations are generated in up and down directions on the panoramic coordinate system. It should be noted that the sweep axis is a longitudinal direction for the respective picked-up images.

For that reason, a single image obtained by connecting the effective areas of the respective picked-up images is not rectangular. In view of the above, as illustrated in FIG. 15B, the image synthesis unit 311 cuts out a largest rectangular area P11 inscribed to the area of the entire image obtained by connecting the effective areas of the picked-up images I(0) to I(6) to obtains a panoramic image. At this time, long sides of the rectangular area P11 are set to be parallel to the sweep axis. In this manner, by performing the trimming, the rectangular panoramic image can be obtained.

When the panoramic image is generated in this manner, the image synthesis unit 311 outputs the generated panoramic image, and the generation processing for the panoramic image in the image pickup apparatus 10 is ended.

For example, the panoramic image output from the image synthesis unit 311 is encoded by the encoding/decoding unit 41 to be recorded in the memory 42 or output via the D/A conversion unit 43 and the video encoder 44 to the display unit 45 for displaying the image.

As described above, the image pickup apparatus 10 sets the connection line from the picked-up images on the basis of a plurality of different algorithms. Also, the image pickup apparatus 10 projects the subject information in the sweep direction to set the connection line. Furthermore, the image pickup apparatus 10 selects the connection line in accordance with the image pickup condition so that the optimal panoramic image can be obtained and connects (synthesizes) the picked-up images at the selected connection line to generate the panoramic image.

In this manner, in the image pickup apparatus 10, the subject information is projected in the sweep direction to set the connection line, and it is therefore possible to obtain the still higher quality panoramic image at the even lower calculation cost.

Figure 1:
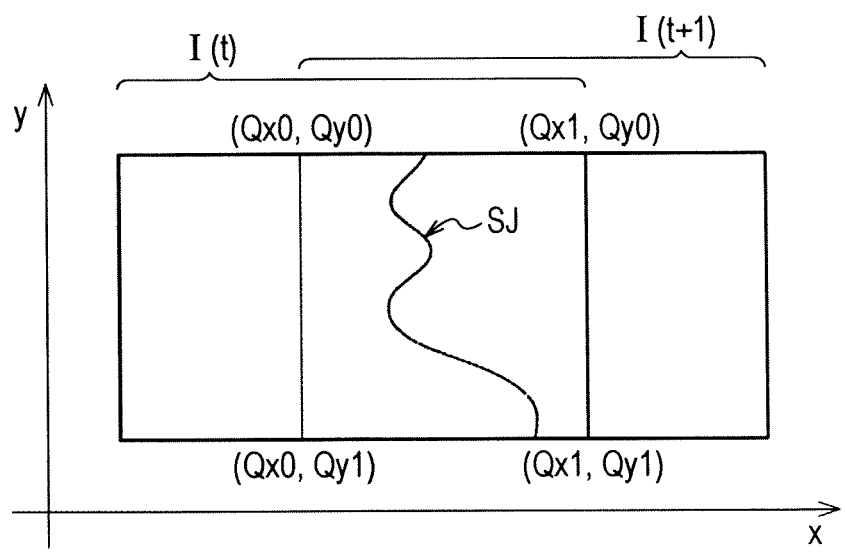
FIG. 1 is an explanatory diagram for describing a search method for a seam in related art.

That is, according to the related-art technology, as described with reference to FIG. 1, if the connection line (seam SL) is set through the two-dimensional search, such problems that the moving subject is blurred and the moving subject is divided are addressed, and it is possible to obtain the panoramic image at the still higher quality. However, according to the two-dimensional search, the calculation cost is high, and the recording capacity of the memory used for the two-dimensional search is large.

On the other hand, in the image pickup apparatus 10, the two-dimensional information composed of the subject information on the respective areas is projected on the one-dimensional axis which is the sweep axis, and it is therefore possible to set the connection line through a one-dimensional search. With this configuration, while the blur or division of the moving subject is prevented, not only the panoramic image having the still higher quality can be obtained at the even lower calculation cost, but also the recording capacity of the memory can be reduced.

Also, the connection line is set on the basis of the plurality of algorithms, and the optimal connection line in accordance with the image pickup condition is selected. For this reason, even when is carried out under such an image pickup condition that the two-dimensional rotation between the picked-up images is occurred, the optimal connection line in accordance with the image pickup condition is selected, and it is therefore possible to easily generate the high quality panoramic image in which the seam is not conspicuous.

Furthermore, as the optimal connection line in accordance with the image pickup condition is automatically set, it is therefore possible to obtain the panoramic image with the high image quality at a high speed while the user does not demonstratively select or instruct the algorithms for setting the connection line before or after the image pickup. For this reason, the usability for the user can be improved.

5. Another Example of Subject Information

It should be noted that the description has been given in the above that the evaluation value serving as the subject information is set as the differential absolute value between the motion vector of the entire picked-up image and the motion vector of the block, but the subject information may be any information as long as the information relates to the subject on the picked-up image.

Figure 16:
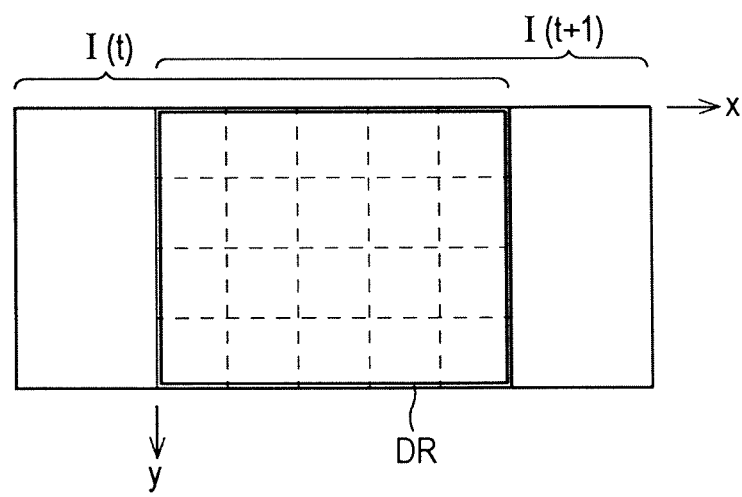
FIG. 16 is an explanatory diagram for describing another example of the subject information.

For example, for the pixels in the overlapping area DR which is an area where the picked-up image I(t) and the picked-up image I(t+1) illustrated in FIG. 16 are overlapped with each other, a differential absolute value between the pixel value of the pixel in the picked-up image I(t) and the pixel value of the pixel in the picked-up image I(t+1) that is located at the same position as the above-mentioned pixel may also be set. It should be noted that in FIG. 16, in this case, the picked-up image I(t) and the picked-up image I(t+1) are disposed on the basis of the motion compensation parameter.

The moving subject detection unit 306 calculates the evaluation value cost (x, y) of the pixel located at (x, y) on the xy coordinate system of the picked-up image I(t) through the following expression (2). It should be noted that in FIG. 16, the horizontal direction is set as the x direction, and the vertical direction is set as the y direction. Also, the apex on the upper left of the overlapping area DR is set as the reference position of the xy coordinate system, and the x direction is set as the same direction as the direction of the sweep axis.

$$\mathrm{cost}(x,y) = |It(x,y) - It+1(x,y)| \qquad (2)$$

Herein, in the expression (2), It (x, y) and It+1 (x, y) indicate pixel values of the pixels of the picked-up image I(t) and the picked-up image I(t+1) whose coordinates are (x, y).

In a case such evaluation values are used as the subject information, in an area where the differential absolute value of the pixel values on the picked-up image is small, it is determined that the positional shift of the subject due to the connection is small. When the differential absolute value of the pixel values is set as the evaluation value, an advantage is obtained that not only the positional shift caused by the motion of the moving subject but also the positional shift of the subject or the like which is caused by the parallax error or the accuracy insufficiency in the motion compensation with respect to the motion of the image pickup apparatus 10 can also be reflected on the evaluation values.

Figure 17:
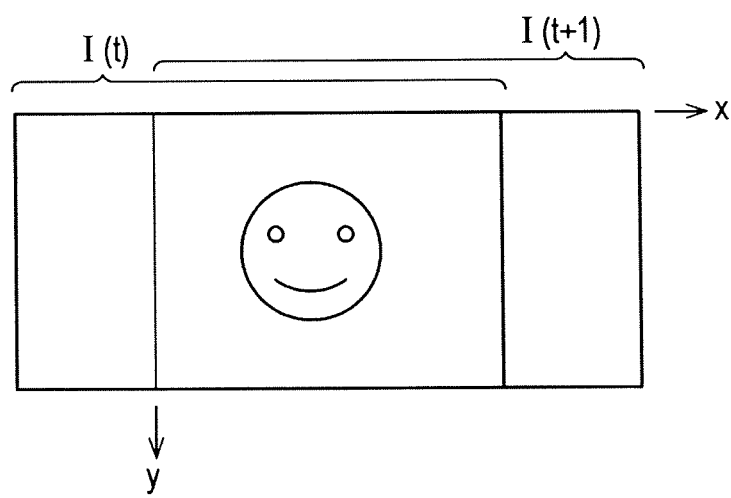
FIG. 17 is an explanatory diagram for describing another example of the subject information.

Furthermore, as illustrated in FIG. 17, by utilizing a detection of a human face, an evaluation value using a likelihood of the human face as an index may be obtained as the subject information. It should be noted that in FIG. 17, the picked-up image I(t) and the picked-up image I(t+1) are disposed on the basis of the motion compensation parameter.

The moving subject detection unit 306 detects the human face while the overlapping area overlapped with the picked-up image I(t+1) is set as the target in the picked-up image I(t). As a result, an area having a predetermined size where the human face on the picked-up image I(t) is expected to be included (hereinafter, which will be referred to as face area) and a point indicating a degree of a likelihood of the area for the human face with respect to the face area are obtained. This point is higher as the face area is more likely to be the human face.

Then, the moving subject detection unit 306 obtains the evaluation value for each position of the overlapping area of the picked-up image I(t). That is, when the position is included in the face area, the value of the point for the face area is set as the evaluation value at the position, and if the position is not included in the face area, the evaluation value at the position is "0".

By performing a similar processing, the moving subject detection unit 306 detects the human face while the area overlapped with the picked-up image I(t) in the picked-up image I(t+1) is set as the target and obtains the evaluation values at the respective positions of the picked-up image I(t+1). Furthermore, the moving subject detection unit 306 adds the evaluation values at the respective positions of the overlapping areas on the picked-up image I(t) to evaluation values at positions of the picked-up image I(t+1) which are overlapped with the above-mentioned positions and sets the thus obtained values as the final evaluation values at the respective positions of the overlapping areas on the picked-up image I(t).

In the example of FIG. 17, as the human face is included substantially at the center of the overlapping area, the evaluation values in the vicinity of the center of the overlapping area are expected to be high. In many cases, the picked-up image includes a person as a moving subject, but a method of setting the evaluation values as the subject information in which the human face is used as the index is effective in a case where at the time of the connection of the picked-up images, the division of the face part by the connection line is to be avoided more eagerly than the division of arms and legs or the trunk of the person.

Figure 18:
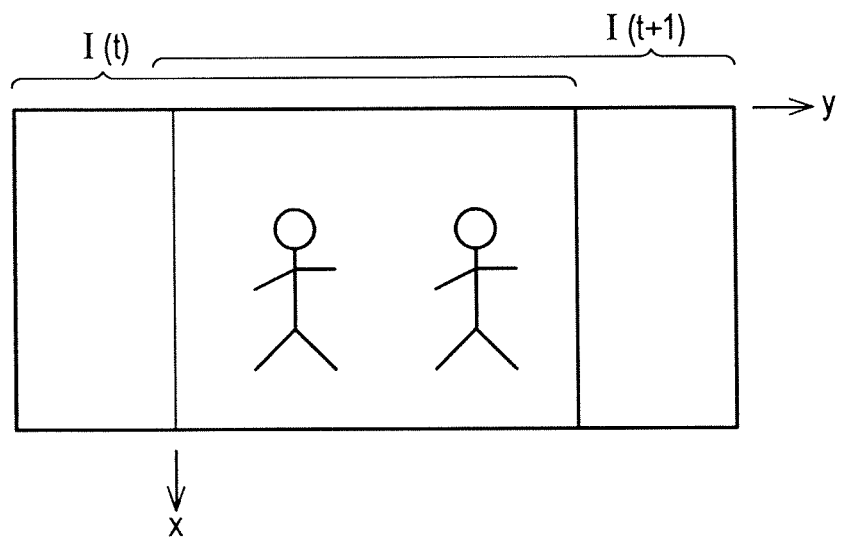
FIG. 18 is an explanatory diagram for describing another example of the subject information.

Furthermore, as illustrated in FIG. 18, by utilizing the detection of the person, the evaluation using the likelihood of the person as the index may also be obtained as the subject information. It should be noted that in FIG. 18, the picked-up image I(t) and the picked-up image I(t+1) are disposed on the basis of the motion compensation parameter.

The moving subject detection unit 306 detects the person while the overlapping area in the picked-up image I(t) which is overlapped with the picked-up image I(t+1) is set as the target. As a result, the area having a predetermined size expected to include the person on the picked-up image I(t) (hereinafter, which will be referred to as person area) and a point indicating a degree of the likelihood of the area for the person with respect to the person area are obtained. This point is higher as the person area is more likely to be the person.

Then, the moving subject detection unit 306 obtains the evaluation value for each position of the overlapping area of the picked-up image I(t). That is, when the person area is included in the position, the value of the point on the person area is the evaluation value at the location, and when the position is not included in the person area, the evaluation value at the position is "0".

By performing a similar processing, the moving subject detection unit 306 detects the person while the area overlapped with the picked-up image I(t) in the picked-up image I(t+1) is set as the target and obtains the evaluation values at the respective positions of the picked-up image I(t+1). Furthermore, the moving subject detection unit 306 adds the evaluation values at the respective positions of the overlapping areas on the picked-up image I(t) with the evaluation values at the positions of the picked-up image I(t+1) which are overlapped with the above-mentioned positions and sets the thus obtained value as the final evaluation values at the respective positions of the overlapping areas on the picked-up image I(t).

In the example of FIG. 18, the person is included on both the right side and the left side from the center of the overlapping area, and the evaluation values on the right side and the left side from the center of the overlapping area are expected to be higher. In this manner, a method of setting the evaluation values as the subject information in which the entire person is used as the index is effective in a case where at the time of the connection of the picked-up images, the division of the entire person by the connection line is to be avoided.

Also, the subject information may be set by combining some of the evaluation values respectively described with reference to FIG. 9 and FIGS. 16 to 18.

For example, a sum of the evaluation value described with reference to FIG. 9 and the evaluation value described with reference to FIG. 17 may be used as the evaluation values at the respective positions (the subject information) of the picked-up image. In this case, it is possible to set a still larger evaluation value with respect to the area of the human face.

Also, for example, the sum of the evaluation value described with reference to FIG. 9 and a the evaluation value described with reference to FIG. 17 may be set as the subject information, and in addition, a sum of the respective evaluation values described with reference to FIG. 9, FIG. 17, and FIG. 18 may be set as the subject information. In these cases, the sum of the evaluation values for each position on the picked-up images is obtained, and the obtained sun is set as the subject information at the respective positions.

6. Another Example of Decision Order for Connection Lines

Furthermore, it has been described in the above that the connection line for the picked-up image is set in the ascending order of the frame numbers, but the order for setting the connection line may be any order. That is, while a predetermined frame is set as a reference, the connection line may be set sequentially from the picked-up image in the relevant frame.

For example, as illustrated in FIG. 19A, it is assumed that in the area on the image pickup space which is the image pickup for the picked-up image, the person of the moving subject moves in a direction from the left to the right. In such a state, it is assumed that while the sweep direction is set as the direction from the left to the right, the image pickup apparatus 10 picks up a plurality of images, and as a result, as illustrated in FIG. 19B, the seven picked-up images I(0) to I(6) are obtained.

In this example, the picked-up images I(2) to I(4) include the same person as the moving subject. At the time of the image pickup for the picked-up images, the person of the moving subject moves in the direction from the left to the right. Thus, the picked-up image I(2) in the first frame including the person displays the person on the left end of the image. Also, the picked-up image I(3) in the subsequent frame including the person displays the person at the center of the image, and the picked-up image I(4) in the further subsequent frame including the person displays the person on the right side of the image.

In such a case, the connection line may be set in the order from the picked-up image I(0) to the picked-up image I(6). However, the connection line is set so as to avoid the area of the moving subject, and therefore an adverse effect from the avoidance of the area of the moving subject in a predetermined connection line may affect the decision on the next connection line in some cases. That is, in a scene where the frames including the moving subject continuously appear, a different panoramic image can be obtained depending on the order for deciding the connection line is some cases.

In view of the above, in the second connection line setting unit 308, a decision is made on a frame in which the picked-up images is prioritized to be dealt with, and the decided frame is set as the reference frame. Furthermore, from the picked-up image in the reference frame, the connection line is decided sequentially in the respective directions of the ascending order and the descending order for the frame numbers corresponding to the order in which the picked-up images are picked up.

In such a case, as the index for deciding the reference frame, for example, the centricity of the moving subject is conceivable. That is, the moving subject detection unit 306 detects the moving subject from the respective picked-up images with regard to the picked-up images I(0) to I(6) by using the picked-up images in the continuous two frames. For example, as described by using FIG. 9, the detection of the moving subject is carried out by dividing the overlapping area of the picked-up image into blocks and obtaining a difference between the motion vector for each block and the motion vector for the entire picked-up image. With this configuration, the presence or absence of the moving subject in the respective areas of the picked-up images is detected. For example, the area where the obtained differential absolute value is equal to or larger than the predetermined threshold is set as the area of the moving subject.

Next, on the basis of the detection result of the moving subject, the moving subject detection unit 306 obtains the centricity of the moving subject for each picked-up image. For example, a score of the moving subject is set on the basis of the position of the moving subject in the picked-up image. The score of the moving subject is set to be higher as the position of the moving subject is closer to the center of the picked-up image. It should be noted that in a case where a plurality of moving subjects are included in one picked-up image, a total sum of the scores obtained for each of those moving subjects is set as the final score of the centricity.

Therefore, the picked-up image including the moving subject located closer to the center has the higher score of the centricity. Also, the picked-up image including more moving subjects has the higher score of the centricity. According to the score of the centricity, it is possible to identify the picked-up image where the moving subject is closest to the center on the image among the plural picked-up images.

In the example of FIGS. 19A and 19B, the score of the centricity of the picked-up image I(3) is the highest. The thus obtained score of the centricity for each frame is output together with the subject information from the moving subject detection unit 306 via the subject information projection unit 307 to the second connection line setting unit 308.

Then, in the second connection line setting unit 308, the frame having the highest centricity score among the respective frames of the picked-up image is set as the reference frame, and the second connection line is decided in the order from the picked-up image in the reference frame.

Therefore, in the example of FIGS. 19A and 19B, the frame of the picked-up image I(3) is set as the reference. First, the second connection line for the picked-up images I(3) and I(4) is set, and thereafter, in the ascending order, the second connection line for the picked-up images I(4) and I(5) and the second connection line for the picked-up images I(5) and I(6) are sequentially set. Furthermore, after that, from the reference frame, in the descending order, the second connection line for the picked-up images I(3) and I(2), the second connection line for the picked-up images I(2) and I(1), and the second connection line for the picked-up images I(1) and I(0) are sequentially set.

Figure 20A:
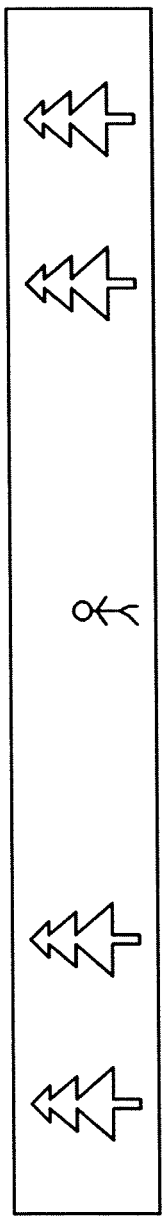
FIGS. 20A to 20C are explanatory diagrams for describing a decision order for the connection lines.

Then, when the generation of the panoramic image is carried out by using the second connection line, as illustrated in FIG. 20A, the panoramic image where the moving subject is displayed at the center is obtained.

At the time of the image pickup for the picked-up images, in order that the human body is located in the vicinity of the center of all the areas which are the image pickup targets, a plurality of images are picked up while the image pickup apparatus 10 is swept in many cases. For that reason, it is supposed that among the continuous frames including the human body, in the frame in the vicinity of the center of those frames, the human body exists in the vicinity of the center of all the areas which are the image pickup targets, and the human body exists at the center of the picked-up image in the frame.

Therefore, among the frames including the human body, the frame where the human body exists at the center of the picked-up image is set as the reference frame, and the connection line is decided sequentially from the reference frame. With this configuration, as illustrated in FIG. 20A, the panoramic image where the moving subject is displayed substantially at the center is obtained.

Figure 20B:
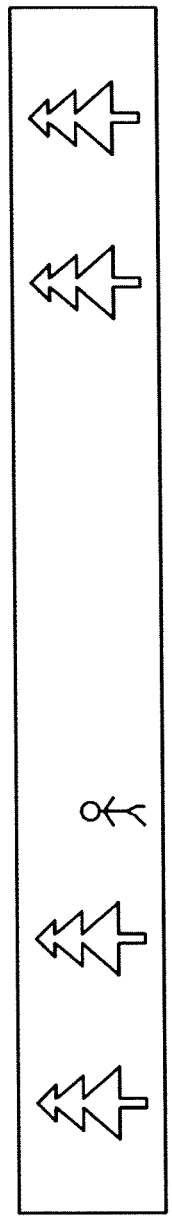
Figure 20C:
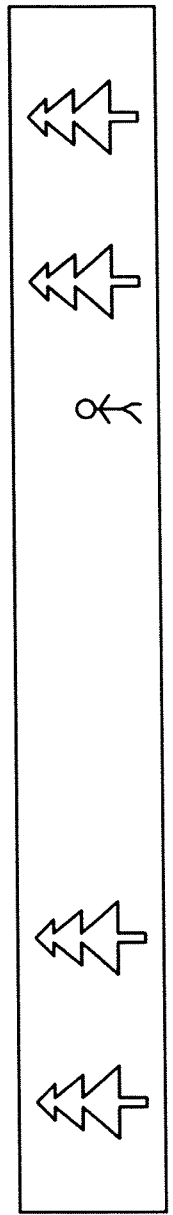

It should be noted that in FIG. 19B, while the frame of the picked-up image I(2) where the moving subject exists in the vicinity of the left end is set as the reference frame, when the second connection line is set sequentially from the picked-up image I(2), as illustrated in FIG. 20B, the panoramic image where the moving subject is displayed slightly on the left side from the center is obtained. Similarly, in FIG. 19B, while the frame of the picked-up image I(4) where the human body exists in the vicinity of the right end is set as the reference frame, the connection line is set sequentially from the picked-up image I(4), as illustrated in FIG. 20C, the panoramic image where the moving subject is displayed slightly on the right side from the center is obtained.

In this manner, when the position or the like of the moving subject in the picked-up image is set as the index and the second connection line is set sequentially from the picked-up image in the particular reference frame, it is possible to obtain the still more spectacular panoramic image.

7. Case of Executing Processing by Using Program

The above-mentioned series of processings can be executed hardware and can also be executed by software. In a case where the above-mentioned series of processings is executed by the software, a program structuring the software is installed from a program recording medium into a computer incorporated in dedicated-use hardware or a general-use personal computer or the like which is, for example, capable of executing various functions by installing various programs and the like.

Figure 21:
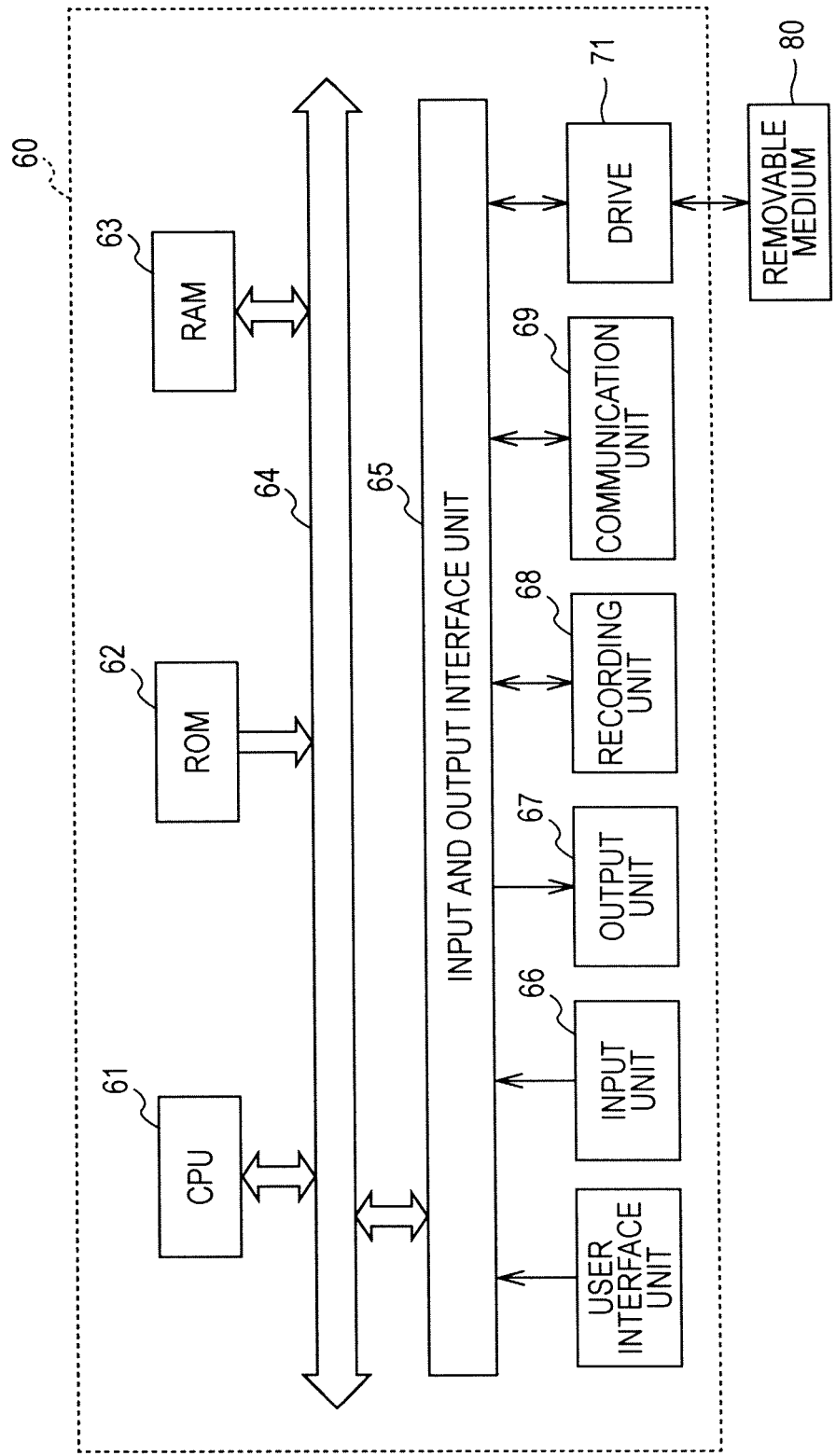
FIG. 21 illustrates a configuration example of a computer.

FIG. 21 is a block diagram of a hardware configuration example of the computer for executing the above-mentioned series of processings by the programs.

In a computer 60, a CPU (Central Processing Unit) 61, a ROM (Read Only Memory) 62, and a RAM (Random Access Memory) 63 are mutually connected by a bus 64.

Furthermore, an input and output interface unit 65 is connected to the bus 64. To the input and output interface unit 65, an input unit 66 composed of a key board, a mouse, a microphone, or the like, an output unit 67 composed of a display, a speaker, or the like, a recording unit 68 composed of a hard disc, a non-volatile memory, or the like, a communication unit 69 composed of a network interface or the like, the magnetic disc, the optical disc, the opto-magnetic disc, and a drive 71 for driving a removable medium 80 such as a drive or a semiconductor memory are connected.

In the computer structured as described above, the above-mentioned series of processings is carried out while the CPU 61 loads a program stored in the recording unit 68, for example, via the input and output interface unit 65 and the bus 64 onto the RAM 63 for the execution.

The program executed by the computer (the CPU 61) is provided while being recorded, for example, on the removable medium 80 serving as package media composed of the magnetic disc (including a flexible disc), the optical disc (CD-ROM (Compact Disc-Read Only Memory), a DVD (Digital Versatile Disc) or the like), the opto-magnetic disc, or the semiconductor memory or provided via a wired or wireless transmission medium such as a local area network, the internet, or digital satellite broadcasting.

Then, the program can be installed into the recording unit 68 via the input and output interface unit 65 by mounting the removable medium 80 to the drive. Also, program can be received by the communication unit 69 via the wired or wireless transmission medium to be installed into the recording unit 68. In addition to the above, the program can be previously installed into the ROM 62 or the recording unit 68.

It should be noted that the program executed by the computer may be a program in which the processings are performed in a time-series manner in the order described in the present specification or a program in which the processings are performed in parallel or at an appropriate timing, for example, when a call is generated.

The present application contains subject matter related to that disclosed in Japanese Priority Patent Application JP 2009-288859 filed in the Japan Patent Office on Dec. 21, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a motion compensation parameter calculation unit to calculate a parameter for compensating a relative motion in an image pickup apparatus that performs image pickup between a plurality of picked-up images obtained by performing the image pickup while sequentially changing an image pickup direction;
a first connection line setting unit to set as a first connection line a central position with respect to a changing direction of the image pickup direction in an overlapping area where adjacent picked-up images are mutually overlapped which is determined at least in part on the basis of the motion compensation parameter;
a moving subject detection unit to generate subject information by detecting a moving subject using the picked-up images in the overlapping area;
a subject information projection unit to project the subject information in the overlapping area on a sweep axis which is the changing direction of the image pickup direction;
a second connection line setting unit to set of a second connection line at least in part on a basis of the projected subject information;
an image pickup condition detection unit to detect an image pickup condition in which a two-dimensional rotation between the picked-up images is occurred; and
a connection line selection unit to select one of the first connection line and the second connection line as a connection line for the adjacent picked-up images in accordance with a detection result of the image pickup condition detection unit;
wherein the image pickup condition detection unit detects a two-dimensional rotation angle between the picked-up images or an angle in the image pickup direction of the image pickup apparatus which is orthogonal to the sweep axis, and
wherein the connection line selection unit selects the first connection line when the rotation angle or the angle in the image pickup direction is larger than a previously set threshold range and selects the second connection line when the rotation angle or the angle in the image pickup direction is within the threshold range;
wherein the moving subject detection unit uses an evaluation value in accordance with a motion amount of the moving subject as the subject information;
wherein the subject information projection unit projects the subject information on the sweep axis by integrating evaluation values at the respective positions on the picked-up image in a direction orthogonal to the sweep axis; and
the second connection line setting unit sets a direction orthogonal to the sweep axis at a position where the projected evaluation value is smallest as the second connection line.

2. The image processing apparatus according to claim 1, wherein the image pickup condition detection unit detects the angle by using a detection signal from an attitude detection unit provided in the image pickup apparatus.

3. The image processing apparatus according to claim 1, further comprising:
an image projection unit to utilize the motion compensation parameter and to project the plurality of picked-up images on a panoramic coordinate system; and
an image synthesis unit to connect the picked-up images projected on the panoramic coordinate system at the selected connection line to generate a panoramic image.

4. An image processing method comprising the steps of:
calculating a parameter for compensating a relative motion in an image pickup apparatus that performs image pickup between a plurality of picked-up images obtained by performing the image pickup while sequentially changing an image pickup direction;
setting a first connection line a central position with respect to a changing direction of the image pickup direction in an overlapping area where adjacent picked-up images are mutually overlapped, which is determined at least in part on a basis of the motion compensation parameter;
generating subject information by detecting a moving subject using the picked-up images in the overlapping area and using an evaluation value in accordance with a motion amount of the moving subject;
projecting the subject information in the overlapping area on a sweep axis which is the changing direction of the image pickup direction by integrating evaluation values at the respective positions on the picked-up image in a direction orthogonal to the sweep axis;
performing a setting of a second connection line at least in part on a basis of the projected subject information to set a direction orthogonal to the sweep axis at a position where the projected evaluation value is smallest as the second connection line;
detecting an image pickup condition in which a two-dimensional rotation between the picked-up images is occurred; and
selecting one of the first connection line and the second connection line as a connection line for the adjacent picked-up images in accordance with a detection result of the image pickup condition detection unit.

5. A computer readable medium on which is stored a program which when implemented by a computer causes the computer to function as:
motion compensation parameter calculation means to calculate a parameter for compensating a relative motion in an image pickup apparatus that performs image pickup between a plurality of picked-up images obtained by performing the image pickup while sequentially changing an image pickup direction;
first connection line setting means to set as a first connection line a central position with respect to a changing direction of the image pickup direction in an overlapping area where adjacent picked-up images are mutually overlapped which is determined at least in part on the basis of the motion compensation parameter;
moving subject detection means to generate subject information by detecting a moving subject using the picked-up images in the overlapping area and using an evaluation value in accordance with a motion amount of the moving subject;
subject information projection means to project the subject information in the overlapping area on a sweep axis which is the changing direction of the image pickup direction by integrating evaluation values at the respective positions on the picked-up image in a direction orthogonal to the sweep axis;

second connection line setting means to perform setting of a second connection line at least in part on a basis of the projected subject information to set a direction orthogonal to the sweep axis at a position where the projected evaluation value is smallest as the second connection line;

image pickup condition detection means that detects an image pickup condition in which a two-dimensional rotation between the picked-up images is occurred; and connection line selection means that selects one of the first connection line and the second connection line as a connection line for the adjacent picked-up images in accordance with a detection result of the image pickup condition detection means.

* * * * *